United States Patent
Takagi et al.

(10) Patent No.: US 10,686,768 B2
(45) Date of Patent: Jun. 16, 2020

(54) APPARATUS AND METHOD FOR CONTROLLING PROFILE DATA DELIVERY

(71) Applicant: FUJITSU LIMITED, Kawasaki-shi, Kanagawa (JP)

(72) Inventors: Junji Takagi, Kawasaki (JP); Ikuya Morikawa, Kawasaki (JP); Takao Ogura, Yokohama (JP); Dai Yamamoto, Kawasaki (JP); Yumi Sakemi, Kawasaki (JP); Naoya Torii, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 333 days.

(21) Appl. No.: 15/591,824

(22) Filed: May 10, 2017

(65) Prior Publication Data

US 2017/0366525 A1 Dec. 21, 2017

(30) Foreign Application Priority Data

Jun. 17, 2016 (JP) .................. 2016-120401

(51) Int. Cl.
  *H04L 9/32* (2006.01)
  *H04L 29/06* (2006.01)
  (Continued)

(52) U.S. Cl.
  CPC .......... *H04L 63/061* (2013.01); *G06F 9/4451* (2013.01); *G06F 21/32* (2013.01);
  (Continued)

(58) Field of Classification Search
  CPC ..... H04L 63/20; H04L 63/205; H04L 63/123; H04L 9/3247; G06F 21/64; H04W 4/50
  See application file for complete search history.

(56) References Cited

U.S. PATENT DOCUMENTS

2002/0112162 A1* 8/2002 Cocotis .................. H04L 63/08
                                                                 713/176
2004/0104265 A1 6/2004 Okada et al.
(Continued)

FOREIGN PATENT DOCUMENTS

JP 2004-178408 6/2004
JP 2007-188430 A 7/2007
(Continued)

OTHER PUBLICATIONS

Extended European Search Report dated Oct. 30, 2017 for corresponding European Patent Application No. 17172424.8, 7 pages.
(Continued)

*Primary Examiner* — Trong H Nguyen
(74) *Attorney, Agent, or Firm* — Fujitsu Patent Center

(57) ABSTRACT

In a profile data delivery control apparatus, a storage unit stores therein a public key and a private key. A control unit obtains profile data including the identification information of a service provided using a server, and when the profile data satisfies a prescribed validity condition, attaches a signature to the profile data using the private key. The control unit embeds the public key to be used to verify the signature, in a client application that causes a client to perform an authentication process based on the profile data, and delivers the client application with the public key embedded.

5 Claims, 26 Drawing Sheets

(51) Int. Cl.
- *H04W 4/50* (2018.01)
- *G06F 21/64* (2013.01)
- *H04W 12/08* (2009.01)
- *G06F 21/33* (2013.01)
- *H04W 8/24* (2009.01)
- *G06F 21/32* (2013.01)
- *G06F 9/445* (2018.01)
- *H04W 12/06* (2009.01)
- *H04L 9/12* (2006.01)
- *H04W 12/00* (2009.01)
- *H04L 29/08* (2006.01)

(52) U.S. Cl.
CPC .............. *G06F 21/33* (2013.01); *G06F 21/64* (2013.01); *H04L 9/12* (2013.01); *H04L 9/3247* (2013.01); *H04L 63/0435* (2013.01); *H04L 63/0442* (2013.01); *H04L 63/08* (2013.01); *H04L 63/083* (2013.01); *H04L 63/0861* (2013.01); *H04L 63/10* (2013.01); *H04L 63/123* (2013.01); *H04L 63/20* (2013.01); *H04W 4/50* (2018.02); *H04W 8/245* (2013.01); *H04W 12/0023* (2019.01); *H04W 12/06* (2013.01); *H04W 12/08* (2013.01); *H04L 67/34* (2013.01); *H04W 12/00505* (2019.01)

(56) References Cited

U.S. PATENT DOCUMENTS

| | | | |
|---|---|---|---|
| 2007/0004393 | A1 | 1/2007 | Forsberg et al. |
| 2009/0227274 | A1 | 9/2009 | Adler et al. |
| 2013/0232546 | A1 | 9/2013 | Shimono |
| 2014/0122350 | A1* | 5/2014 | Takemoto ............ G06Q 30/018 705/317 |
| 2017/0139691 | A1* | 5/2017 | Zheng ....................... G06F 9/44 |

FOREIGN PATENT DOCUMENTS

| | | |
|---|---|---|
| JP | 2008-117326 | 5/2008 |
| JP | 2011-170795 | 9/2011 |
| JP | 2013-182460 | 9/2013 |
| WO | 2014/011026 A1 | 1/2014 |

OTHER PUBLICATIONS

European Office Action dated Dec. 12, 2019 for corresponding European Patent Application No. 17172424.8, 7 pages.

Japanese Office Action dated Mar. 10, 2020 for corresponding Japanese Patent Application No. 2016-120401 with, English Translation, 8 pages.

\* cited by examiner (EXAMPLE OF PROFILE DATA 321a)

| DATA | TYPE | DESCRIPTION |
|---|---|---|
| TENANT IDENTIFIER | String | IDENTIFIER IDENTIFYING TENANT |
| ADDRESS OF WEB SERVER | String | ADDRESS INDICATING WEB SERVER OF TENANT AND BEING USED IN ACCESS TO SERVICE |
| VALID PERIOD (START) | String | LETTER STRING REPRESENTING DATE INFORMATION (DATE AND TIME) INDICATING START TIME POINT OF VALID PERIOD |
| VALID PERIOD (END) | String | LETTER STRING REPRESENTING DATE INFORMATION (DATE AND TIME) INDICATING END TIME POINT OF VALID PERIOD |
| SERVER CERTIFICATE | String | CERTIFICATE WRITTEN IN PEM FORMAT |
| AUTHENTICATION INFORMATION | Integer | SETTING INFORMATION USED IN AUTHENTICATION (AUTHENTICATION METHOD, AUTHENTICATION LEVEL, AND OTHERS) |

FIG. 8

VARIATION #1

(EXAMPLE OF MASTER PROFILE DATA 321b)

| DATA | TYPE | DESCRIPTION |
|---|---|---|
| TENANT IDENTIFIER | String | IDENTIFIER IDENTIFYING TENANT |
| ADDRESS OF WEB SERVER | String | ADDRESS INDICATING WEB SERVER OF TENANT AND BEING USED IN ACCESS TO SERVICE |
| VALID PERIOD (START) | String | LETTER STRING REPRESENTING DATE INFORMATION (DATE AND TIME) INDICATING START TIME POINT OF VALID PERIOD |
| VALID PERIOD (END) | String | LETTER STRING REPRESENTING DATE INFORMATION (DATE AND TIME) INDICATING END TIME POINT OF VALID PERIOD |
| SERVER CERTIFICATE | String | CERTIFICATE WRITTEN IN PEM FORMAT |

FIG. 14

VARIATION #1

(EXAMPLE OF SUB-PROFILE DATA 311b)

| DATA | TYPE | DESCRIPTION |
|---|---|---|
| AUTHENTICATION LEVEL | String | THRESHOLD FOR COMPARISON IN BIOMETRIC AUTHENTICATION |
| REGISTRATION QUALITY THRESHOLD | String | QUALITY THRESHOLD FOR DETERMINING WHETHER TO REGISTER BIOMETRIC DATA (DETERMINE TO REGISTER BIOMETRIC DATA IF QUALITY IS GREATER THAN OR EQUAL TO THRESHOLD) |

FIG. 15

VARIATION #2

(EXAMPLE OF MASTER PROFILE DATA 321b)

| DATA | TYPE | DESCRIPTION |
|---|---|---|
| TENANT IDENTIFIER | String | IDENTIFIER IDENTIFYING TENANT |
| ADDRESS OF WEB SERVER | String | ADDRESS INDICATING WEB SERVER OF TENANT AND BEING USED IN ACCESS TO SERVICE |
| VALID PERIOD (START) | String | LETTER STRING REPRESENTING DATE INFORMATION (DATE AND TIME) INDICATING START TIME POINT OF VALID PERIOD |
| VALID PERIOD (END) | String | LETTER STRING REPRESENTING DATE INFORMATION (DATE AND TIME) INDICATING END TIME POINT OF VALID PERIOD |
| SERVER CERTIFICATE | String | CERTIFICATE WRITTEN IN PEM FORMAT |
| SERVER CERTIFICATE ISSUANCE METHOD | String | LETTER STRING INDICATING SELF-ISSUANCE OR ISSUANCE BY CERTIFICATE AUTHORITY |

FIG. 19

VARIATION #3

(EXAMPLE OF LICENSE MANAGEMENT DATA 201b)

| DATA | TYPE | DESCRIPTION |
| --- | --- | --- |
| TENANT IDENTIFIER | String | IDENTIFIER IDENTIFYING TENANT |
| ADDRESS OF WEB SERVER | String | ADDRESS INDICATING WEB SERVER OF TENANT AND BEING USED FOR ACCESS TO SERVICE |
| USER NAME #1 | String | IDENTIFICATION INFORMATION (SUCH AS MAIL ADDRESS) TO BE USED WHEN LICENSE IS CONFIRMED |
| LICENSE INFORMATION#1 | String | ATTRIBUTE INFORMATION OF LICENSE HELD (AUTHENTICATION METHOD, TERMINAL INFORMATION, AND OTHERS) |
| USER NAME #2 | String | IDENTIFICATION INFORMATION (SUCH AS MAIL ADDRESS) TO BE USED WHEN LICENSE IS CONFIRMED |
| LICENSE INFORMATION#2 | String | ATTRIBUTE INFORMATION OF LICENSE HELD (AUTHENTICATION METHOD, TERMINAL INFORMATION, AND OTHERS) |
| ⋮ | ⋮ | ⋮ |

FIG. 23

APPARATUS AND METHOD FOR CONTROLLING PROFILE DATA DELIVERY

CROSS-REFERENCE TO RELATED APPLICATION

This application is based upon and claims the benefit of priority of the prior Japanese Patent Application No. 2016-120401, filed on Jun. 17, 2016, the entire contents of which are incorporated herein by reference.

FIELD

The embodiments discussed herein relate to a profile data delivery control apparatus and a profile data delivery control method.

BACKGROUND

In a client-server information processing system, user authentication may be performed to allow a user operating a client to use a service provided by a server. To this end, an information processing system is considered, in which profile data including information about the authentication process is delivered to the client to cause the client to perform at least part of the authentication procedure according to the profile data.

For example, there has been proposed a user authentication method in which a client performs user authentication in response to a request from a server when a user operating the client uses a service provided by the server. In this proposed user authentication method, the client is able to execute plural types of authentication methods, such as password authentication and biometric authentication. The client receives profile data specifying the type of authentication method and an authentication level requested by the server, from the server, and performs the user authentication according to the profile data. The client sends, to the server, the result of the user authentication, the profile data used in the user authentication, and a signature for detecting falsification of the profile data. The server verifies whether the client has performed appropriate user authentication according to proper profile data, on the basis of the information received from the client.

In this connection, there has been proposed a service use permission system for achieving an appropriate authentication level by combining a plurality of authentication methods, such as password authentication, Integrated Circuit (IC) card authentication, and biometric authentication. In the proposed service use permission system, information associating a service identifier with a requested authentication level and information associating an authentication level with a combination of plural authentication methods are stored in advance. When a certain service is desired for use, this proposed service use permission system determines an authentication level requested for the service, finds a combination of authentication methods for satisfying the determined authentication level, and performs the user authentication with the found combination of authentication methods.

Further, there has been proposed a Web authentication system that enables a login to a website from a portable terminal. In the proposed Web authentication system, the portable terminal obtains an authentication ticket including a random authentication number and the address of the website from the Web server. When logging into the website, the portable terminal attaches a signature of the portable terminal to the authentication ticket and sends the authentication ticket to the Web server. The Web server authenticates the portable terminal on the basis of the signature and authentication number.

Still further, there has been proposed a service providing method in which a server provides a service for a user authenticated by another server. In the proposed service providing method, the server stores, in advance, relation information indicating a relation between the server and the other server. The server receives role information indicating the role of the user from a terminal device used by the user, and determines the content of the service to be provided for the user, on the basis of the role information and relation information.

Please see, for example, Japanese Laid-open Patent Publication Nos. 2004-178408, 2008-117326, 2011-170795, and 2013-182460.

An information processing system is considered, in which a client application is installed in an information processing apparatus used by a user, and the client application performs at least part of an authentication procedure according to profile data of a server.

If the profile data has been falsified, there is a risk that an unauthorized user is authorized as an authorized user by error due to a low authentication level. Also, there is another risk that the client application is led to an unauthorized server. To avoid these risks, there is considered a method of confirming the validity of the profile data using a signature or the like, as described earlier, in order to certainly perform an appropriate authentication procedure according to proper profile data.

However, to certainly perform the appropriate authentication procedure according to proper profile data, not only the validity of the profile data itself but also the validity of the client application used by the user needs to be confirmed. This is because an unauthorized client application may conceal an inappropriate authentication procedure performed according to falsified profile data.

With regard to the validity of the client application, for example, there is considered a method of developing a client application including a signature for each service provider (for example, for each server address) and supplying the client application including the signature to users. However, preparing a client application including a signature for each service provider increases the development cost and operating cost of the client application.

SUMMARY

According to one aspect, there is provided a profile data delivery control apparatus including: a memory that stores therein a public key and a private key corresponding to the public key; and a processor that performs a process including obtaining, with respect to each of two or more services provided using a server, profile data including identification information of said each service, and when the profile data satisfies a prescribed validity condition, attaching a signature to the profile data using the private key, and embedding the public key in a client application so that the public key is used to verify the signature, and delivering the client application with the public key embedded, the client application causing a client to perform an authentication process based on the profile data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of profile data according to the second embodiment;

FIG. 14 illustrates an example of master profile data according to the variation #1 of the second embodiment;

FIG. 15 illustrates an example of sub-profile data according to the variation #1 of the second embodiment;

FIG. 19 illustrates an example of master profile data according to a variation example (variation #2) of the second embodiment;

FIG. 23 illustrates an example of license management data according to the variation #3 of the second embodiment;

DESCRIPTION OF EMBODIMENTS

Figure 1:
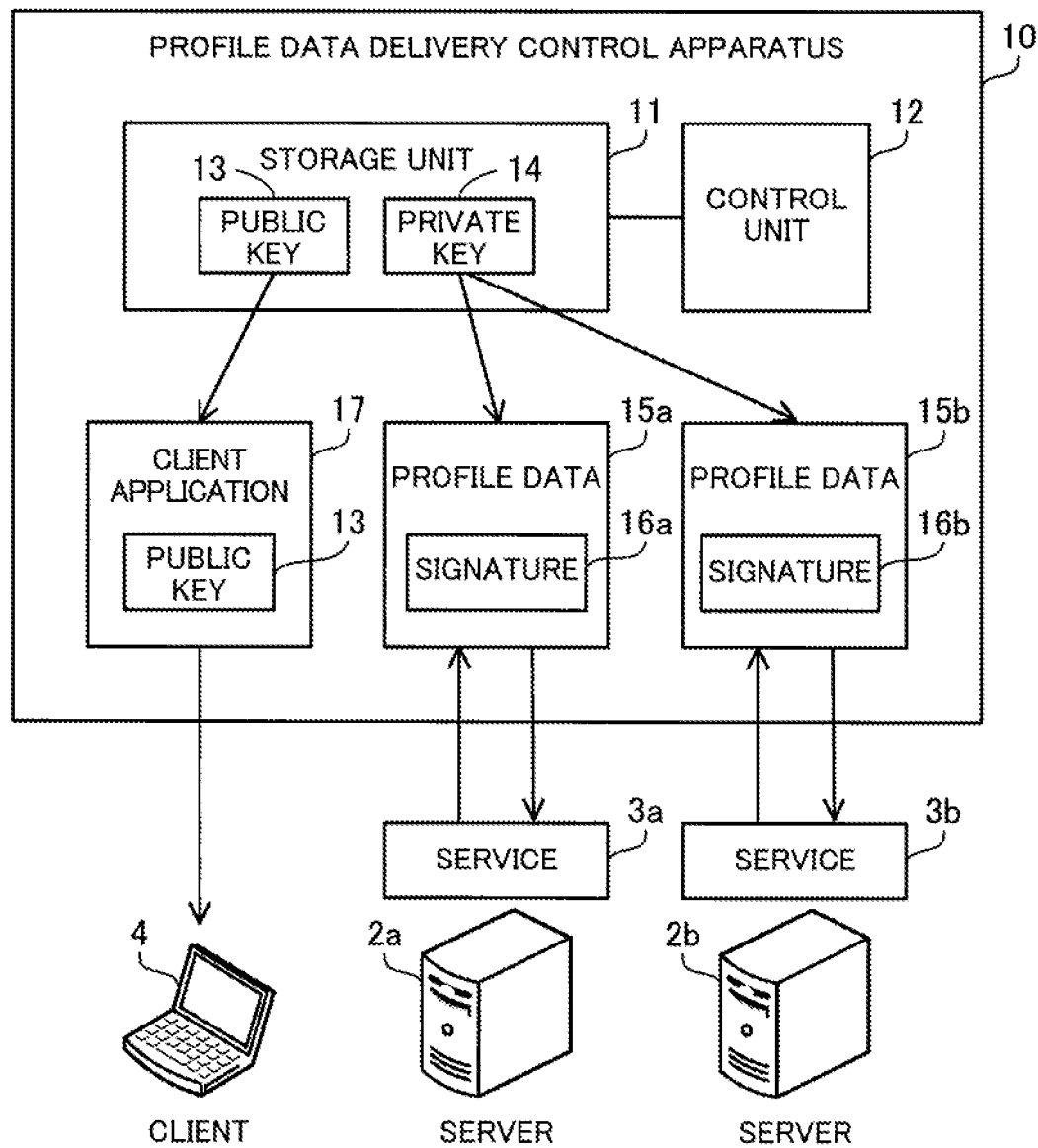
FIG. 1 illustrates an example of a profile data delivery control apparatus according to a first embodiment.

Several embodiments will be described below with reference to the accompanying drawings, wherein like reference numerals refer to like elements throughout.

1. First Embodiment

A first embodiment will now be described.

FIG. 1 illustrates an example of a profile data delivery control apparatus according to the first embodiment.

A profile data delivery control apparatus 10 is an information processing apparatus that manages a plurality of services, such as services 3a and 3b, which are provided using information communication apparatuses, such as servers 2a and 2b. The profile data delivery control apparatus 10 may be a server computer or a client computer that is used by an administrator.

The servers 2a and 2b are server computers that are connected to a network. The server 2a is used to provide the service 3a, whereas the server 2b is used to provide the service 3b. However, the same server may be used to provide the services 3a and 3b. The services 3a and 3b are information processing services that are provided over the network. The services 3a and 3b may be Web services that receive information processing requests over the Internet, perform requested information processing, and return results of the information processing over the Internet. The services 3a and 3b may be provided by the same provider or different providers.

For example, an operations administrator, such as a cloud service provider or a data center service provider, owns the servers 2a and 2b and profile data delivery control apparatus 10. Under a contract with the operations administrator, the provider of the service 3a uses the server 2a to provide the service 3a. Likewise, under a contract with the operations administrator, the provider of the service 3b uses the server 2b to provide the service 3b. In this case, the operations administrator may be called a "service master", and the providers of the services 3a and 3b may be called "tenants". In this connection, the provider of the service 3a may own the server 2a and the provider of the service 3b may own the server 2b.

A client 4 is a client computer that is able to access the services 3a and 3b over the network. The user of the client 4 may be the same as or different from the provider of the service 3a, 3b. The client 4 accesses the service 3a, 3b on the basis of identification information of the service 3a, 3b. For example, Uniform Resource Locators (URL), Internet Protocol (IP) addresses, or other addresses may be used as the identification information of the services 3a and 3b. When using the service 3a, the client 4 communicates with the server 2a. When using the service 3b, the client 4 communicates with the server 2b.

The profile data delivery control apparatus 10 includes a storage unit 11 and a control unit 12. The storage unit 11 may be a volatile semiconductor memory, such as a Random Access Memory (RAM), or a non-volatile storage device, such as a Hard Disk Drive (HDD) or a flash memory. The control unit 12 may be a processor, such as a Central Processing Unit (CPU) or Digital Signal Processor (DSP). The control unit 12 may include an Application Specific Integrated Circuit (ASIC), Field Programmable Gate Array (FPGA), or another application-specific electronic circuit. The processor executes a program stored in a RAM or another memory (may be the storage unit 11). The program to be executed by the processor may include a profile data delivery control program describing processing that will be described later. A set of plural processors may be called a "multiprocessor" or, simply, a "processor".

The storage unit 11 stores therein a public key 13 for a public key encryption scheme, and a private key 14 corresponding to the public key 13. To decrypt data encrypted (for confidentiality) using the public key 13, the private key 14 is always needed. In addition, to decrypt data encrypted (for confidentiality) using the private key 14, the public key 13 is always needed.

The control unit 12 obtains profile data including the identification information (for example, URL) of each service. The profile data is used in an authentication process performed by the client 4, which will be described later.

More specifically, the control unit 12 obtains profile data 15a including the identification information of the service 3a. The control unit 12 may receive the profile data 15a from the server 2a or from another computer that is used by the provider of the service 3a. Likewise, the control unit 12 obtains profile data 15b including the identification information of the service 3b. The control unit 12 may receive the profile data 15b from the server 2b or from another computer that is used by the provider of the service 3b.

When obtaining the profile data 15a, the control unit 12 confirms whether the profile data 15a satisfies a validity condition that the profile data 15a represents the service 3a correctly. To this end, the control unit 12 may automatically check the profile data 15a for the validity condition in terms of some or all items included in the profile data 15a. For example, the control unit 12 determines whether the identification information included in the profile data 15a is the identification information of the service 3a, with reference to a database. Alternatively, the control unit 12 may request the administrator to check the profile data 15a for the validity condition in terms of some or all items included in the profile data 15a. Similarly, when obtaining the profile data 15b, the control unit 12 confirms whether the profile data 15b satisfies a validity condition that the profile data 15b represents the service 3b correctly.

In the case where the profile data 15a satisfies the validity condition, the control unit 12 attaches a signature 16a to the profile data 15a using the private key 14 stored in the storage unit 11. For example, the control unit 12 calculates a hash value on the basis of some or all items included in the original profile data 15a, and encrypts the hash value using the private key 14 to thereby generate the signature 16a. Similarly, in the case where the profile data 15b satisfies the validity condition, the control unit 12 attaches a signature 16b to the profile data 15b using the private key 14 stored in the storage unit 11.

The control unit 12 outputs the profile data 15a with the signature 16a attached. For example, the control unit 12 sends the profile data 15a with the signature 16a attached, to the server 2a or another computer used by the provider of the service 3a. Likewise, the control unit 12 outputs the profile data 15b with the signature 16b attached. For example, the control unit 12 sends the profile data 15b with the signature 16b attached, to the server 2b or another computer used by the provider of the service 3b.

Independently of the above operations, the control unit 12 obtains a client application 17. The client application 17 is application software that is executed by the client 4. The client application 17 may be compiled or developed on the profile data delivery control apparatus 10 or another computer. The client application 17 may be stored in the storage unit 11 or another storage device.

The client application 17 causes the client 4 to perform an authentication process based on the profile data 15a upon receipt of the profile data 15a. The authentication process based on the profile data 15a is requested by the service 3a as a requirement for using the service 3a. Similarly, the client application causes the client 4 to perform an authentication process based on the profile data 15b upon receipt of the profile data 15b. The authentication process based on the profile data 15b is requested by the service 3b as a requirement for using the service 3b.

For example, when accessing a service, the client 4 performs user authentication, such as password authentication, IC card authentication, or biometric authentication, according to profile data corresponding to the service. For example, the client 4 sends a result of the user authentication to a server (corresponding to the service to be accessed) corresponding to the used profile data. The profile data 15a, 15b may indicate a specified authentication method for the authentication process, a specified authentication level indicating a requested level of the authentication, and others.

When obtaining the client application 17, the control unit 12 embeds the public key 13 stored in the storage unit 11, in the client application 17. The client application 17 verifies the signature 16a, 16b using the embedded public key 13.

For example, upon receipt of the profile data 15a, the client application 17 removes (i.e., decrypts) the encryption of the signature 16a using the public key 13, and calculates a hash value from some or all items included in the profile data 15a. When the calculated hash value and a result of decrypting the signature 16a are identical, the client application 17 determines the obtained profile data 15a as proper profile data. If the calculated hash value and the result of decrypting the signature 16a are not identical, the client application determines that the obtained profile data 15a may have been falsified and is thus improper profile data.

The client application 17 may permit the client 4 to access the service 3a when the signature 16a has been verified successfully (that is, when the profile data 15a is determined to be proper). However, the client application 17 may prohibit access of the client 4 to the service 3a when the signature 16a has not been verified (that is, when the profile data 15a is determined to be improper).

The control unit 12 delivers the client application 17 with the public key 13 embedded. Thereby, the client application 17 is installed in the client 4, and the client 4 performs the signature verification and the authentication process. In this connection, the control unit 12 may send the client application 17 directly to the client 4. Alternatively, the control unit 12 may indirectly deliver the client application 17 by uploading the client application 17 to another computer.

With the profile data delivery control apparatus 10 of the first embodiment, the signatures 16a and 16b are attached to the profile data 15a and 15b corresponding to the services 3a and 3b, respectively, using the private key 14 held in the profile data delivery control apparatus 10. This enables the client 4 to confirm that the obtained profile data 15a, 15b has not been falsified and thus is proper profile data, when performing the authentication process based on the profile data 15a, 15b. This reduces a risk that an unauthorized user is determined as an authorized user by error because of an unreasonably low authentication level, a risk that the client 4 is led to an unauthorized server, and other risks.

In addition, with the profile data delivery control apparatus 10, the public key 13 corresponding to the private key 14 is embedded into the client application 17 to be delivered to the client 4. Only when the private key 14 used for generating the signature 16a, 16b corresponds to the public key 13 used in the verification of the signature 16a, 16b, the signature 16a, 16b is verified successfully. Therefore, use of an unauthorized client application leads to a failure in the verification of the signature 16a, 16b. This means that it is possible to reduce a risk of covering up an inappropriate authentication process performed by an unauthorized client application on the basis of falsified profile data.

In addition, the client application 17 with the public key 13 embedded is used for both access to the service 3a and access to the service 3b. Therefore, even if the providers of the services 3a and 3b do not develop their own client applications with signature attached, it is possible to confirm the validity of the client application 17 and to reduce the development cost and operating cost of the client application 17. As described above, it is possible to efficiently detect falsification of the profile data 15a, 15b that is used in the authentication process.

2. Second Embodiment

A second embodiment will now be described. The second embodiment relates to a scheme (hereinafter, referred to as a profile data delivery scheme) for securely delivering profile data to application software (hereinafter, referred to as software) used by a user of a Web service. For example, the profile data includes setting information defining a level of authentication that is performed when the software accesses the Web server.

In the profile data delivery scheme of the second embodiment, the address of the Web server that the software accesses is included in the setting information. In addition, in the profile data delivery scheme of the second embodiment, an entity (hereinafter, a service master) that develops and manages software attaches a signature to the profile data using a private key. Furthermore, in the profile data delivery scheme of the second embodiment, the software having embedded therein a public key corresponding to the above private key is delivered.

The above mechanism makes it possible to verify the signature of the profile data using the public key embedded in the software and to thereby detect falsification of the profile data. In the profile data delivery scheme of the second embodiment, when the signature of the profile data has been verified successfully, access to the address included in the setting information is permitted. In addition, information such as the authentication level included in the setting information is used in the authentication.

As described above, depending on a result of verifying a signature using the software with the public key embedded and the profile data with the signature attached, access of the software to the Web service is restricted, thereby making it possible to prevent use of falsified profile data in the authentication. For example, the mechanism of the profile data delivery scheme according to the second embodiment may be employed in a system illustrated in FIG. 2.

(2-1. System)

Figure 2:
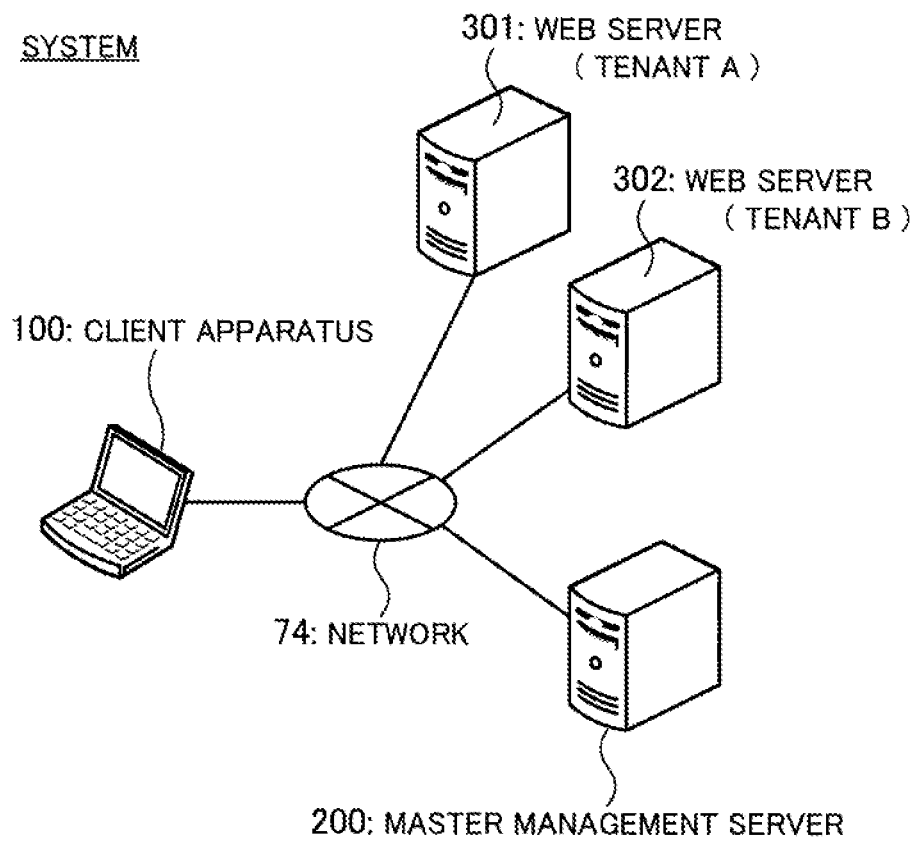
FIG. 2 illustrates an example of a system according to a second embodiment.

A system of the second embodiment will be described with reference to FIG. 2. FIG. 2 illustrates an example of the system according to the second embodiment.

As illustrated in FIG. 2, the system of the second embodiment includes a client apparatus 100, a master management server 200, and Web servers 301 and 302 connected over a network 74.

The client apparatus 100, master management server 200, and Web servers 301 and 302 are computers. For example, the client apparatus 100 is a computer, such as a mobile phone, smartphone, tablet terminal, or Personal Computer (PC). In addition, for example, the master management server 200 and Web servers 301 and 302 are computers, such as PCs or general-purpose computers.

The network 74 is a wired or wireless network. The client apparatus 100, master management server 200, and Web servers 301 and 302 include information in messages and communicate the information therebetween via Transmission Control protocol (TCP)/Internet Protocol (IP) or another protocol.

On the client apparatus 100, software used in authentication operates. For example, this software is delivered via an online store or another that distributes software, and is installed in the client apparatus 100. The master management server 200 functions as an entity (hereinafter, a service master) that develops the above software and also attaches a signature to profile data. The Web servers 301 and 302 provide functions of tenants, which will be described later.

The description continues with the system of FIG. 2 as an example.

(Model)

Figure 3:
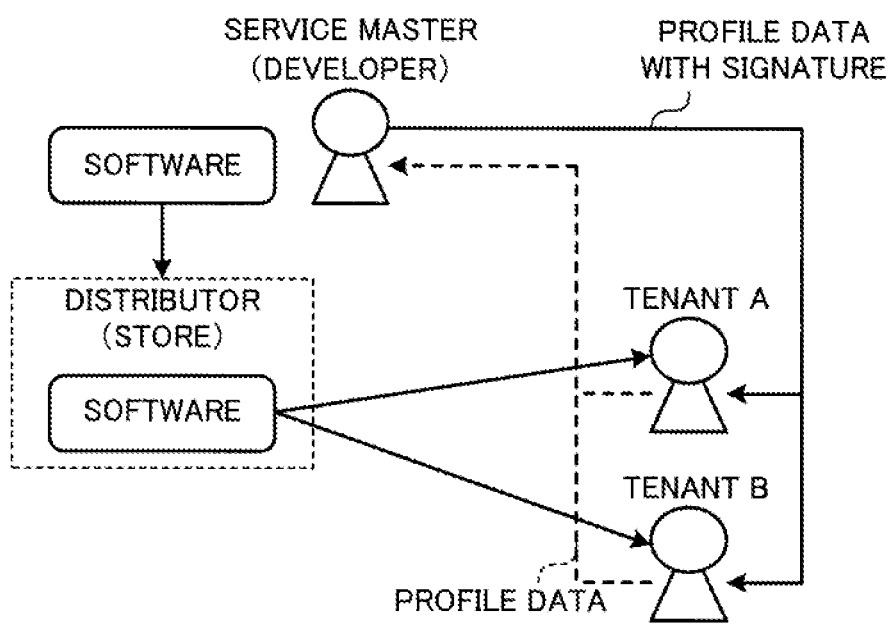
FIG. 3 illustrates a model of a profile data delivery scheme according to the second embodiment.

The following describes a model representing roles that the above-described software, service master, and tenants take in the profile data delivery scheme, with reference to FIG. 3. FIG. 3 illustrates a model of the profile data delivery scheme according to the second embodiment.

The service master develops and manages software for an authentication system. The software is supplied by the service master to a distributor such as an online store, and is then delivered by the distributor to end users (users of the software).

When developing the software, the service master generates a key pair (public key and private key) that is used for generation and verification of a signature. The service master that has received profile data from a tenant A, B obfuscates the public key and embeds the obfuscated public key in the software. In addition, the service master generates a signature for the profile data and attaches the generated signature to the profile data. Then, the service master returns the profile data with the signature attached, to the tenant A, B.

Each of the tenants A and B includes the address of a Web server managed by the own tenant in setting information (information such as authentication level) included in the profile data. Since the address of the Web server is included in the setting information, the setting information and the Web server are associated with each other. For example, in the case where the tenant A manages the Web server 301, the tenant A includes the address of the Web server 301 in the setting information of the profile data.

The end user obtains the software from the online store, and installs the obtained software in the client apparatus 100. When desiring to use the Web server 301 of the tenant A, the end user obtains profile data with a signature attached, from the system administrator of the tenant A. For example, the end user obtains the profile data with the signature attached, via an electronic mail or another.

The end user then verifies the signature of the profile data using the public key embedded in the software. When the signature has been verified successfully, the end user extracts the setting information from the profile data, and embeds the obtained setting information in the software. Using the software with the setting information embedded, the end user is able to proceed to perform the authentication process based on the setting information.

Employing the above model in the system of FIG. 2 makes it possible to prevent use of falsified profile data in authentication.

The system has been described.

(2-2. Hardware)

Figure 4:
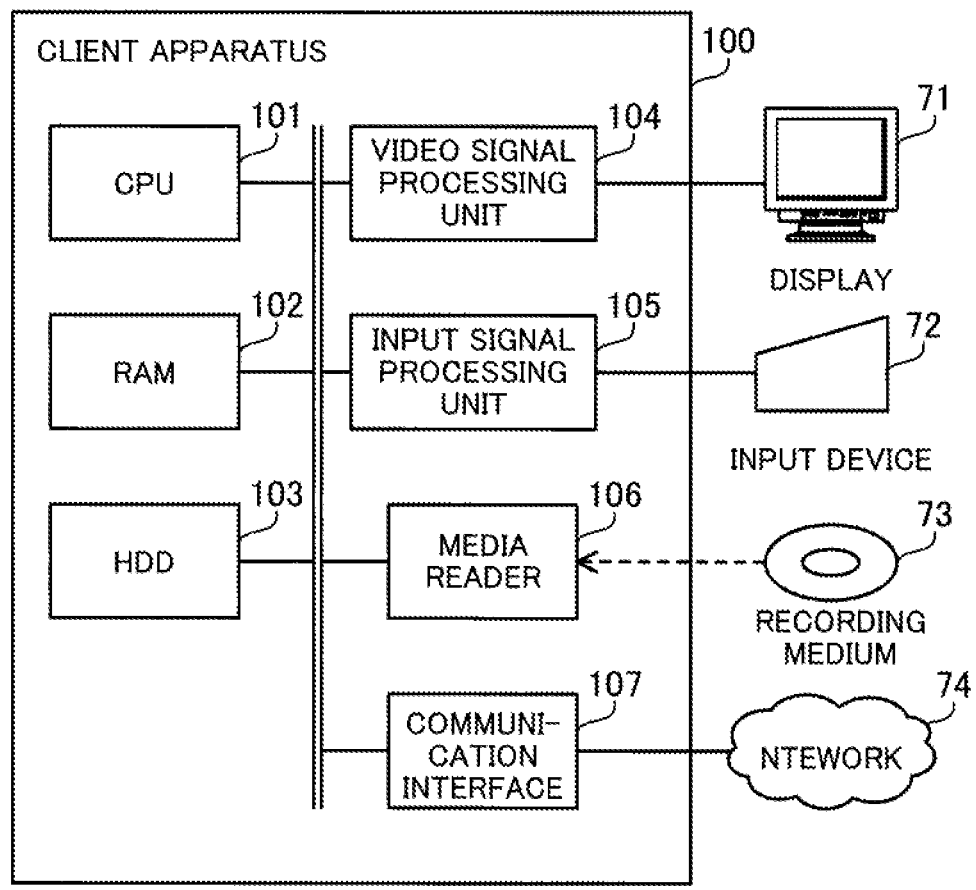
FIG. 4 illustrates an example of hardware for implementing functions of a client apparatus according to the second embodiment.

The following describes hardware of the client apparatus 100 with reference to FIG. 4. FIG. 4 illustrates an example of hardware for implementing functions of a client apparatus according to the second embodiment.

The client apparatus 100 includes a CPU 101, a RAM 102, an HDD 103, a video signal processing unit 104, an input signal processing unit 105, a media reader 106, and a communication interface 107. The CPU 101 is an example of the control unit 12 of the first embodiment.

The CPU 101 is a processor that includes an operation circuit for executing program instructions. The CPU 101 loads at least part of a program and data from the HDD 103 to the RAM 102 and then executes the program.

In this connection, the CPU 101 may be provided with a plurality of processor cores, and the client apparatus 100 may be provided with a plurality of processors. The process to be described later may be performed in parallel using a plurality of processors or processor cores. In addition, a set of plural processors (multiprocessor) may be called a "processor".

The RAM 102 is a volatile memory for temporarily storing programs to be executed by the CPU 101 and data to be used by the CPU 101 in processing. In this connection, the client apparatus 100 may be provided with various kinds of memories other than the RAM or a plurality of memories.

The HDD 103 is a non-volatile storage device for storing software programs, such as Operating System (OS) or application software, and data. In this connection, the client apparatus 100 may be provided with another kind of storage device, such as a flash memory or Solid State Drive (SSD), or a plurality of non-volatile storage devices.

The video signal processing unit 104 outputs images to a display 71 connected to the client apparatus 100 in accordance with instructions from the CPU 101. As the display 71, a Cathode Ray Tube (CRT) display, Liquid Crystal Display (LCD), Plasma Display Panel (PDP), organic Electro-Luminescence (OEL) display, or another may be used.

The input signal processing unit 105 obtains an input signal from an input device 72 connected to the client apparatus 100 and outputs the input signal to the CPU 101.

As the input device 72, a pointing device, such as a mouse, touch panel, touchpad, or trackball, a keyboard, a remote controller, a button switch, or another may be used. In addition, plural kinds of input devices may be connected to the client apparatus 100. In this connection, at least one of the display 71 and input device 72 may be formed integrally with the casing of the client apparatus 100.

In this connection, as the input device 72, a fingerprint reader device used for fingerprint authentication, a vein reader device used for vein authentication, or another may be used. The fingerprint reader device and vein reader device are examples of an authentication means. In this connection, when password authentication is used, a keyboard used as the input device 72 serves as an authentication means.

The media reader 106 reads programs and data from a recording medium 73. As the recording medium 73, a magnetic disk, such as a Flexible Disk (FD) or HDD, an optical disc, such as a Compact Disc (CD) or Digital Versatile Disc (DVD), a Magneto-Optical disk (MO), a semiconductor memory, or another may be used. For example, the media reader 106 stores programs and data read from the recording medium 73 in the RAM 102 or HDD 103.

The communication interface 107 is connected to the network 74 to communicate with another information processing apparatus over the network 74. The communication interface 107 may be a wired communication interface connected to a communication device, such as a switch, with a cable, or a wireless communication interface connected to a base station with a radio link.

The hardware of the client apparatus 100 has been described. In this connection, the functions of the master management server 200 and Web servers 301 and 302 may be implemented by using the same hardware as the client apparatus 100 exemplified in FIG. 4. Therefore, the hardware for implementing the functions of the master management server 200 and Web servers 301 and 302 will not be described.

The hardware has been described.

(2-3. Functions)

The following describes the functions of the client apparatus 100, master management server 200, and Web servers 301 and 302. In this connection, for convenience of explanation, assuming that the Web servers 301 and 302 have the same functions, the functions of the Web server 301 will be described in detail, whereas the functions of the Web server 302 will not be described.

(Client Apparatus)

Figure 5:
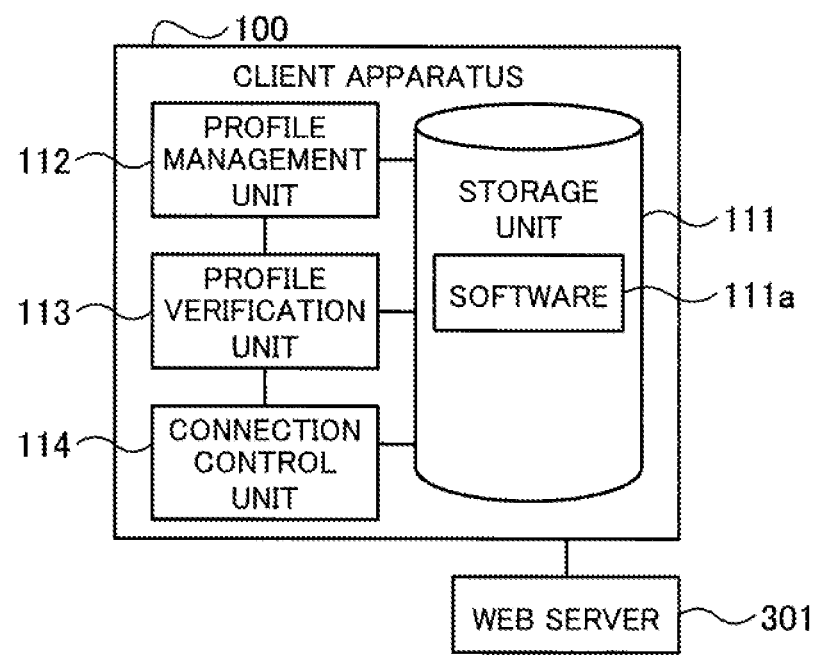
FIG. 5 is a block diagram illustrating an example of the functions of the client apparatus according to the second embodiment.

First, the functions of the client apparatus 100 will be described in detail with reference to FIG. 5. FIG. 5 is a block diagram illustrating an example of the functions of the client apparatus according to the second embodiment.

As illustrated in FIG. 5, the client apparatus 100 includes a storage unit 111, a profile management unit 112, a profile verification unit 113, and a connection control unit 114.

In this connection, functions of the storage unit 111 may be implemented by using the above-described RAM 102, HDD 103, or the like. Functions of the profile management unit 112, profile verification unit 113, and connection control unit 114 may be implemented by using the above-described CPU 101 or the like.

The storage unit 111 stores therein software 111a that causes the client apparatus 100 to perform authentication when accessing the Web server 301. For example, the software 111a is delivered by a service master (master management server 200) via an online store or the like.

For convenience of explanation, hereinafter, it is assumed that the software 111a is application software that is used for accessing the Web server 301. It is also assumed that the software 111a is previously obtained by the user of the client apparatus 100 and is stored in the storage unit 111. In addition, a public key generated and obfuscated by the service master (master management server 200) is embedded in the software 111a.

The profile management unit 112 receives profile data with a signature attached, from the system administrator of a tenant. For example, the profile management unit 112 receives the profile data with the signature attached, via a mail, a file server, or another from the system administrator of the Web server 301 that the user of the client apparatus 100 desires to use.

The profile verification unit 113 uses the public key embedded in the software 111a to verify the signature attached to the profile data received by the profile management unit 112.

When the signature has been verified successfully, the profile verification unit 113 extracts setting information from the profile data. This setting information includes the address of the Web server 301 and information (authentication level and so on) to be used for using the service provided by the Web server 301. The connection control unit 114 accesses the Web server 301 on the basis of the address indicated in the setting information extracted from the profile data, and then performs an authentication process on the basis of the information such as the authentication level.

The functions of the client apparatus 100 have been described.

(Master Management Server)

Figure 6:
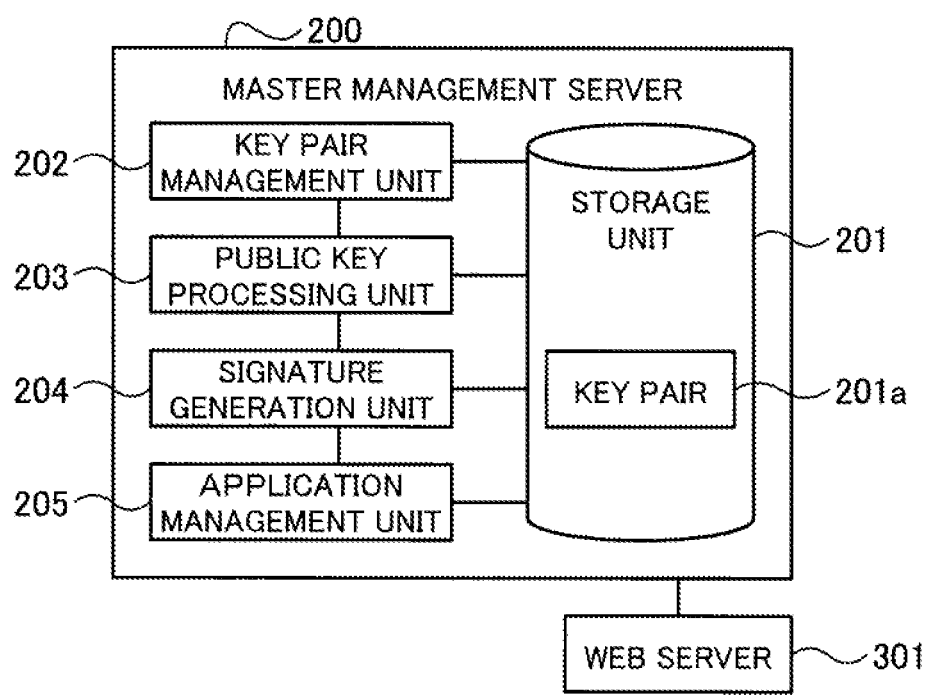
FIG. 6 is a block diagram illustrating an example of functions of a master management server according to the second embodiment.

The functions of the master management server 200 will now be described with reference to FIG. 6. FIG. 6 is a block diagram illustrating an example of the functions of the master management server according to the second embodiment.

As illustrated in FIG. 6, the master management server 200 includes a storage unit 201, a key pair management unit 202, a public key processing unit 203, a signature generation unit 204, and an application management unit 205.

In this connection, functions of the storage unit 201 may be implemented by using the RAM 102 or HDD 103, described earlier, or the like. Functions of the key pair management unit 202, public key processing unit 203, signature generation unit 204, and application management unit 205 may be implemented by using the CPU 101, described earlier, or the like.

The storage unit 201 stores therein a key pair 201a that is a pair of public key and private key. The public key is embedded in application software such as the software 111a. The private key is used for generating a signature to be attached to profile data.

The key pair management unit 202 generates a pair of public key and private key to be used in common for access to Web servers (Web servers 301 and 302) of a plurality of tenants, and stores the pair of public key and private key as the key pair 201a in the storage unit 201. The public key processing unit 203 obfuscates the public key to be embedded in application software such as the software 111a. For example, the public key processing unit 203 obfuscates the public key by inserting specific data in the public key, encrypting part or whole of the public key, or performing another process.

The signature generation unit 204 generates a signature to be attached to profile data using the private key. The signature generation unit 204 that has obtained the profile data checks the content of the profile data, and when the content is correct, generates a signature to be attached to the profile data using the private key. Then, the signature generation unit 204 attaches the generated signature to the profile data.

In this connection, the content of the profile data is checked in the following way.

The profile data includes a tenant identifier identifying a tenant, the address of the Web server of the tenant, a valid period (start), the valid period (end), a server certificate, and authentication information (authentication level and so on.), which will be described later.

The signature generation unit 204 manages tenant information including the tenant identifier and the address of the Web server of the tenant, and others, and if the tenant information matches the content of the profile data, determines that the content regarding the tenant is correct.

In addition, the signature generation unit 204 refers to the valid period of the server certificate, included in the profile data, and if the valid period is not an apparently questionable value (if it is not too long valid period or the like), determines that the content relating to the valid period is correct. In addition, if the authentication level of the authentication information included in the profile data is greater than or equal to a preset value (default value), the signature generation unit 204 determines that the content regarding the authentication level is correct.

Then, when the content of the profile data is determined to be correct in view of the above various items, the signature generation unit 204 generates a signature to be attached to the profile data. In this connection, if the content of the profile data is not determined to be correct in view of the above various items, the signature generation unit 204 may request the service master to check the content of the profile data. In this case, if the service master determines that the content is correct, the signature generation unit 204 generates a signature to be attached to the profile data.

The application management unit 205 embeds the obfuscated public key in application software such as the software 111a. Then, the application management unit 205 delivers the application software with the public key embedded, to the users of the Web servers 301 and 302 via a distributor, such as an online store.

The functions of the master management server 200 have been described.

(Web server)

Figure 7:
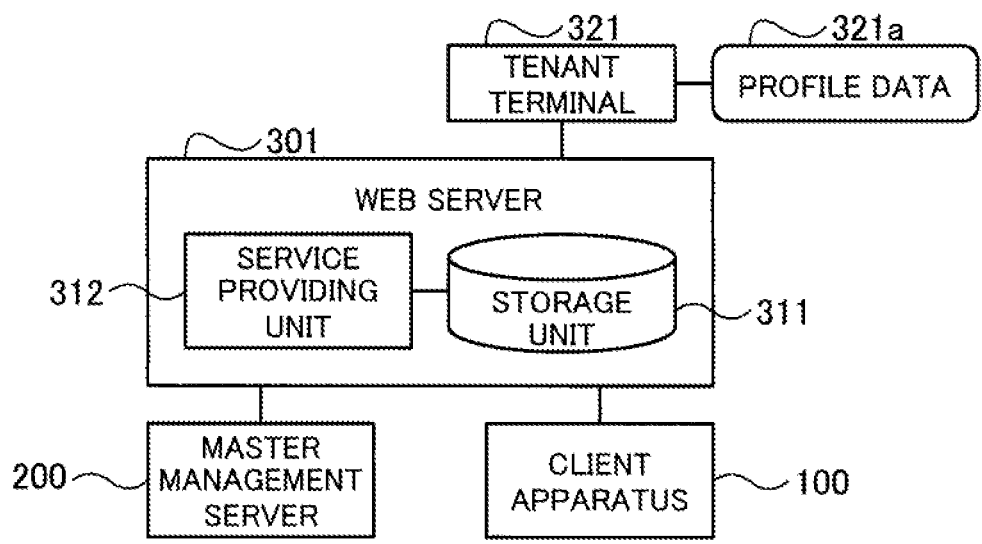
FIG. 7 is a block diagram illustrating an example of functions of a Web server according to the second embodiment.

The functions of the Web server 301 will now be described with reference to FIG. 7. Since the Web servers 301 and 302 have substantially the same functions, the functions of the Web server 301 will be described, and the functions of the Web server 302 will not be described. FIG. 7 is a block diagram illustrating an example of the functions of the Web server according to the second embodiment.

As illustrated in FIG. 7, the Web server 301 includes a storage unit 311 and a service providing unit 312. In addition, the Web server 301 is connected to the tenant terminal 321 that is used by the administrator of a tenant as an operating terminal.

In this connection, functions of the storage unit 311 may be implemented by using the RAM 102 or HDD 103, described earlier, or the like. Functions of the service providing unit 312 may be implemented by using the CPU 101, described earlier, or the like. In addition, functions of the tenant terminal 321 may be implemented by using the same hardware as the client apparatus 100 illustrated in FIG. 4.

The tenant terminal 321 stores therein profile data 321a. For example, the profile data 321a contains content as illustrated in FIG. 8. FIG. 8 illustrates an example of the profile data according to the second embodiment. As illustrated in FIG. 8, the profile data 321a includes a tenant identifier, the address of the Web server 301, a valid period (start), the valid period (end), a server certificate, and authentication information.

The tenant identifier is an identifier identifying a tenant. For example, the profile data 321a includes a tenant identifier identifying the tenant of the Web server 301. The address of the Web server is an address indicating the Web server of the tenant and is used in access to a service. For example, the profile data 321a includes the URL of the Web server 301.

The valid period (start) is a letter string representing date information indicating the start time point of the valid period of the server certificate. The valid period (end) is a letter string representing date information indicating the end time point of the valid period of the server certificate. The server certificate is a certificate written in Privacy Enhanced Mail (PEM) format. For example, a letter string obtained by converting the X509 certificate in Distinguished Encoding Rules (DER) format into PEM format is used as the server certificate.

The authentication information is information such as an authentication method and authentication level, to be used in authentication. For example, the authentication method is fingerprint authentication, vein authentication, or another. The authentication level is a threshold for comparison between actual biometric data (image data of a fingerprint pattern actually acquired from a living body in the case of the fingerprint authentication) and a template (registered biometric data). For example, in the case where the features of a fingerprint pattern and the features of a template match with a rate greater than or equal to a threshold level, the authentication is determined to be successful.

The administrator of the tenant uses the tenant terminal 321 to generate the profile data 321a. In addition, the tenant terminal 321 supplies the profile data 321a to the master management server 200 to make a request for attachment of a signature corresponding to the Web server 301 to the profile data 321a. Then, the tenant terminal 321 sends the profile data 321a with the signature attached by the master management server 200, to the client apparatus 100 via an electronic mail, a file server, or another.

As described above, the administrator of the tenant supplies the profile data 321a to the client apparatus 100 in order to specify an authentication method to be executed by the client apparatus 100. For example, when the fingerprint authentication is specified as the authentication method, the user of the Web server 301 enters his/her fingerprint using an authentication means (fingerprint reader device) of the client apparatus 100, and performs the authentication process. The client apparatus 100 stores registered information (registered password, registered biometric information, or another) to be used in comparison in the authentication process, and when the authentication process is completed, sends the result (success or failure) of the authentication to the Web server 301.

If the authentication result received from the client apparatus 100 indicates a success, the service providing unit 312 provides the Web service for the client apparatus 100. If the authentication result received from the client apparatus 100 indicates a failure, the service providing unit 312 does not provide the Web service for the client apparatus 100.

The functions of the Web server 301 have been described.

(2-4. Processing Flow)

The following describes a processing flow performed among the client apparatus 100, the master management server 200, and the tenant terminal 321. In this connection, for convenience of explanation, a process related to the Web server 301 will be described. The Web server 302 operates in the same way.

(Profile Data Delivery Scheme)

Figure 9:
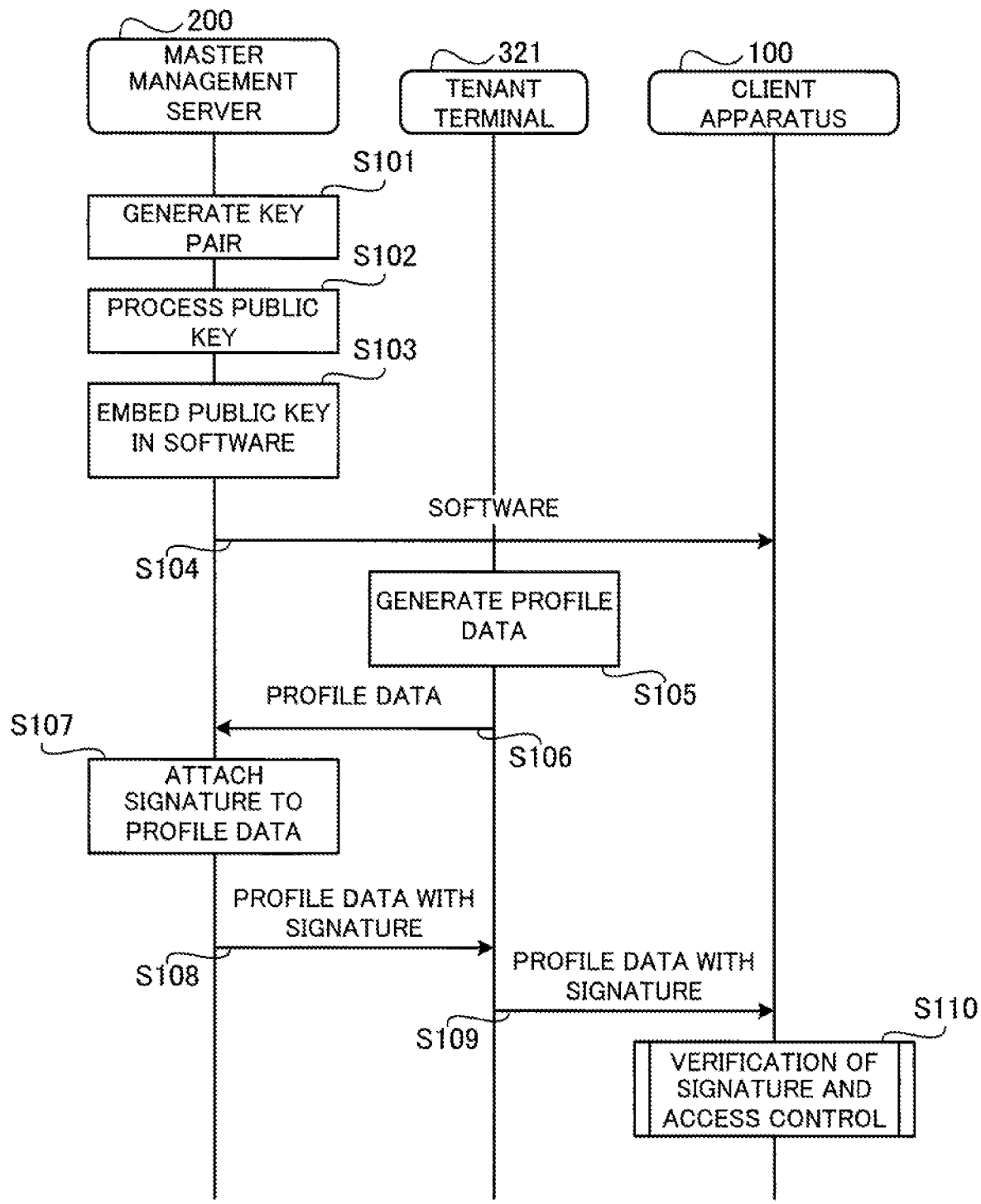
FIG. 9 is a sequence diagram for a process that is performed with the profile data delivery scheme according to the second embodiment.

First, a processing flow relating to delivery of the profile data 321a will be described with reference to FIG. 9. FIG. 9 is a sequence diagram for a process that is performed with a profile data delivery scheme according to the second embodiment.

(S101) The key pair management unit 202 of the master management server 200 generates a pair of public key and private key, and stores the pair as a key pair 201a in the storage unit 201. For example, the key pair management unit 202 generates a pair of public key and private key that is used in common by the Web servers 301 and 302.

(S102) The public key processing unit 203 of the master management server 200 processes the public key. For example, the public key processing unit 203 encrypts the public key with an encryption scheme, such as Advanced Encryption Standard (AES), to obfuscate the public key. In this connection, the public key processing unit 203 may employ another method than the encryption, for obfuscating the public key.

(S103) The application management unit 205 of the master management server 200 builds the software 111a to embed the obfuscated public key in the software 111a. In this connection, the building is a process of generating an executable file by performing a process of compiling the source code of the software 111a, a process of linking libraries, and other processes.

(S104) The application management unit 205 of the master management server 200 delivers the software 111a with the obfuscated public key embedded, to a user (client apparatus 100 or another) of the Web server 301. For example, the application management unit 205 delivers the software 111a via an online store or the like, which distributes application software. In this connection, the user of the client apparatus 100 obtains the software 111a and installs the software 111a in the client apparatus 100 (to make the software 111a executable).

(S105) The tenant terminal 321 generates the profile data 321a (refer to FIG. 8). For example, the tenant terminal 321 generates the profile data 321a using the prepared tenant identifier, URL of the Web server 301, server certificate, valid period (start and end) of the server certificate, and authentication information.

(S106) The tenant terminal 321 sends the profile data 321a to the master management server 200 to make a request for attachment of a signature.

(S107) The signature generation unit 204 of the master management server 200 checks the content of the profile data 321a and if the content is correct, generates a signature to be attached to the profile data 321a, using the private key. For example, when the address of the Web server 301, the valid period of the server certificate, and the authentication level of the authentication information are determined to be appropriate, the signature generation unit 204 generates a signature to be attached to the profile data 321a, and then attaches the generated signature to the profile data 321a.

(S108) The signature generation unit 204 of the master management server 200 returns the profile data 321a with the signature attached, to the tenant terminal 321.

(S109) The tenant terminal 321 delivers the profile data 321a with the signature attached, received from the master management server 200, to the user (in this example, the client apparatus 100) of the Web server 301. For example, the tenant terminal 321 delivers the profile data 321a with the signature attached, to the client apparatus 100 via a mail, a file server, or another.

(S110) The profile verification unit 113 of the client apparatus 100 extracts the public key from the software 111a, and verifies the signature of the profile data 321a with the signature attached, delivered by the tenant terminal 321, using the extracted public key. In this connection, the verification of the signature is performed when the software 111a is activated, for example. In addition, the connection control unit 114 of the client apparatus 100 controls access to the Web server 301 according to the verification result of the signature.

(Verification of Signature and Access Control)

Figure 10:
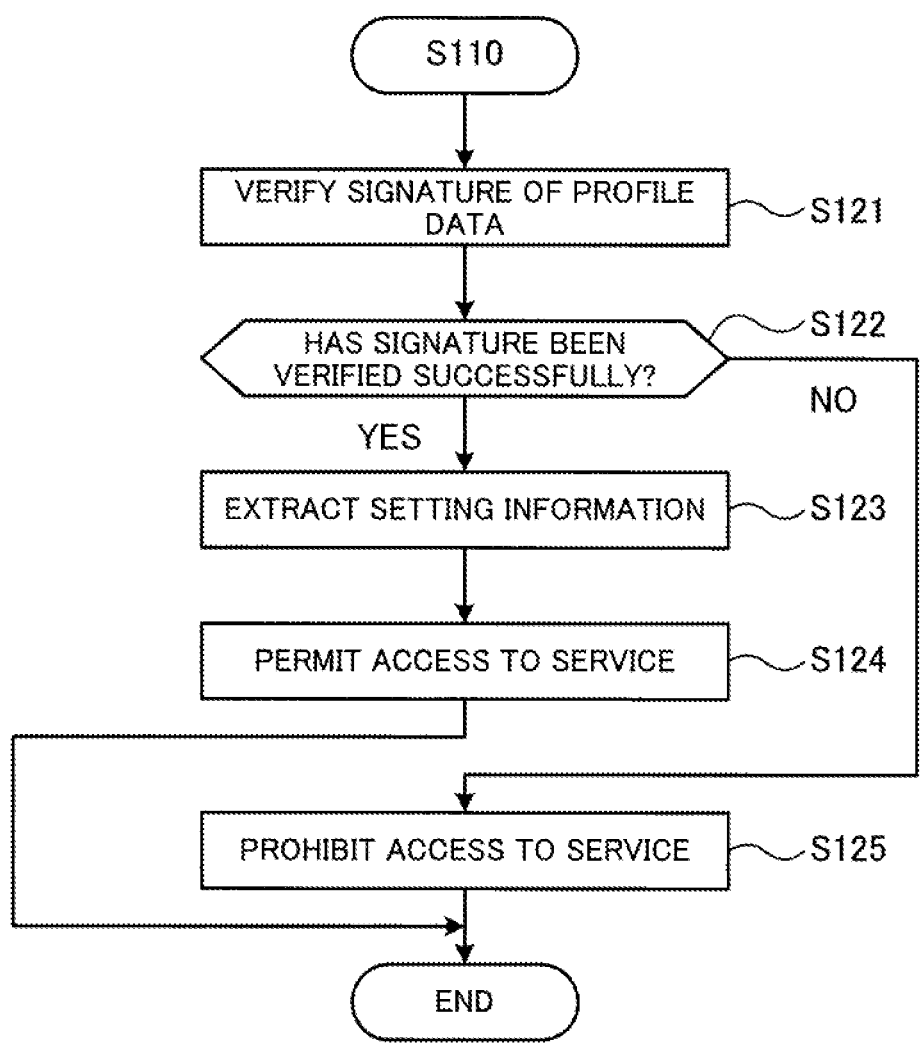
FIG. 10 is a flow diagram for a process relating to verification of a signature and access control according to the second embodiment.

The following further describes a process relating to the verification of a signature and access control of the above S110, with reference to FIG. 10. FIG. 10 is a flow diagram for the process relating to the verification of a signature and the access control according to the second embodiment.

(S121) The profile verification unit 113 extracts the public key from the software 111a. At this time, the profile verification unit 113 decrypts the public key encrypted with, for example, the AES scheme. Then, the profile verification unit 113 verifies the validity of the signature attached to the profile data 321a using the extracted public key.

(S122) The connection control unit 114 determines whether the signature has been verified successfully by the profile verification unit 113 (whether the validity of the signature has been confirmed). If the signature has been verified successfully, the process proceeds to S123. If the signature has not been verified, the process proceeds to S125.

(S123) The connection control unit 114 extracts the setting information from the profile data 321a. For example, the connection control unit 114 extracts the address of the Web server 301, the server certificate, the valid period (start and end) of the server certificate, and the authentication information (authentication method, authentication level, and others) from the profile data 321a. Then, at the time of accessing the Web server 301 using the software 111a, the connection control unit 114 makes the extracted setting information usable (loading of the setting information).

(S124) The connection control unit 114 permits the software 111a to access the service (Web service provided by the Web server 301). When S124 is completed, the process of FIG. 10 is completed.

(S125) The connection control unit 114 prohibits access of the software 111a to the service. That is to say, the connection control unit 114 exercises control so as not to make access to the Web server 301 using the software 111a. When S125 is completed, the process of FIG. 10 is completed.

The verification of the signature attached to the profile data 321a has been described. If there is other profile data, the same process is performed on all the profile data when the software 111a is activated. Then, the access to the service provided by the Web server is permitted or prohibited for each tenant.

After that, the user of the client apparatus 100 selects a desired tenant on a screen provided by the software 111a, to use the tenant. For example, assume the case where access to the service of the tenant of the Web server 301 is permitted. When the user selects the tenant, the authentication process is performed by the client apparatus 100 with an authentication method specified in the profile data 321a. Then, the authentication result is sent to the Web server 301. In the case where the access to the service of the tenant selected by the user is prohibited, an error screen is displayed on the client apparatus 100.

The processing flow relating to the delivery of the profile data 321a has been described.

With the above mechanism, a public key is embedded in the software 111a which is then delivered, and a signature is attached to the profile data 321a which is then supplied. This enables the client apparatus 100 to confirm the validity of the profile data 321a. Therefore, it is possible to reduce a risk of using unauthorized profile data delivered by a malicious person in authentication and a risk that the client apparatus 100 is led to a malicious Web server.

(2-5. Variation Example #1)

The following describes a variation example (variation #1) of the second embodiment.

The variation #1 relates to a mechanism for separately managing master profile data defining setting information such as a server identifier, and sub-profile data defining setting information such as an authentication level or registration quality to be used in biometric authentication. The master profile data defines fixed setting information that may be able to be public. The sub-profile data defines setting information that has confidentiality and may be able to be modified. By managing the sub-profile data separately, it is possible to reduce a risk of leaking the setting information with confidentiality when profile data is delivered.

(Client Apparatus)

Figure 11:
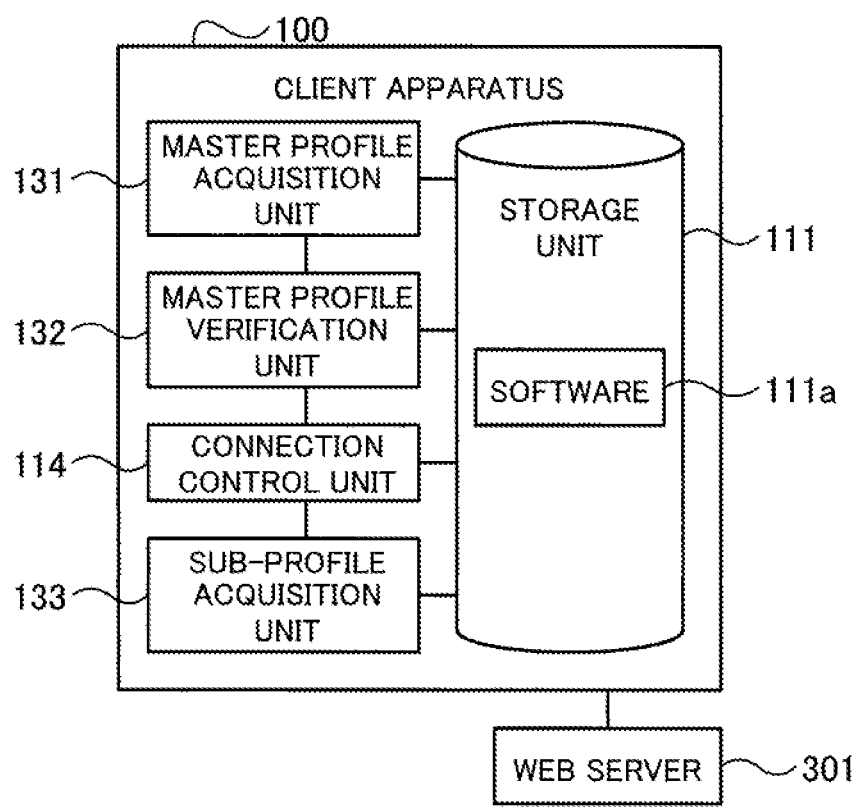
FIG. 11 is a block diagram illustrating an example of functions of a client apparatus according to a variation example (variation #1) of the second embodiment.

First, functions of a client apparatus 100 according to the variation #1 will be described with reference to FIG. 11. FIG. 11 is a block diagram illustrating an example of the functions of the client apparatus according to the variation #1 of the second embodiment.

As illustrated in FIG. 11, the client apparatus 100 includes a storage unit 111, a master profile acquisition unit 131, a master profile verification unit 132, a connection control unit 114, and a sub-profile acquisition unit 133.

A main difference of the client apparatus 100 of the variation #1 from the client apparatus 100 of FIG. 5 is that the master profile acquisition unit 131 and master profile verification unit 132 replace the profile management unit 112 and profile verification unit 113. In addition, the sub-profile acquisition unit 133 is additionally provided in the client apparatus 100 of the variation #1. That is to say, in the variation #1, the client apparatus 100 has functions modified so as to manage the master profile data and the sub-profile data separately.

In this connection, functions of the master profile acquisition unit 131, master profile verification unit 132, and sub-profile acquisition unit 133 may be implemented by using the CPU 101, described earlier, or the like.

The master profile acquisition unit 131 receives master profile data with a signature attached, from the system administrator of a tenant. For example, the master profile acquisition unit 131 receives the master profile data with the signature attached, from the system administrator of the Web server 301 that the user of the client apparatus 100 desires to use, via a mail, a file server, or another.

The master profile verification unit 132 uses a public key embedded in software 111a to verify the signature attached to the master profile data received by the master profile acquisition unit 131.

When the signature has been verified successfully, the master profile verification unit 132 extracts setting information from the master profile data. This setting information includes the address of the Web server 301 and information to be used for acquiring sub-profile data. The sub-profile acquisition unit 133 accesses the Web server 301 using Transport Layer Security (TLS) on the basis of the address indicated in the setting information extracted from the master profile data, and obtains the sub-profile data from the Web server 301 on the basis of the setting information.

The sub-profile data includes setting information such as an authentication level or registration quality. The authentication level indicates the strictness for comparison (a threshold for matching) to be performed in determination as to whether actually obtained biometric information matches a previously registered template. For example, in the case where a distance between a feature point obtained from an actual fingerprint image and a feature point obtained from a template image is used for the comparison, the authentication level represents a threshold for evaluating how close these feature points are.

The sub-profile acquisition unit 133 uses the setting information (authentication method, authentication level, and others) included in the sub-profile data to perform a process of displaying a screen promoting an operation for biometric authentication, a process of setting a threshold for comparison to be used in the biometric authentication, and others. Then, the sub-profile acquisition unit 133 performs an authentication process (that is, authentication using a fingerprint reader device or another) on the basis of the setting information included in the sub-profile data, biometric information entered by the user of the client apparatus 100, and others.

If the signature has not been verified, the connection control unit 114 prohibits the sub-profile acquisition unit 133 from acquiring the sub-profile data.

As described above, the master profile data and the sub-profile data are acquired separately, so as to allow acquisition of the sub-profile data only when the validity of the Web server 301 has been confirmed using the server certificate included in the master profile data. With this mechanism, only when a TLS connection between the client apparatus 100 and the Web server 301 is established, the sub-profile data including confidential information is sent over the TLS connection, which makes it possible to reduce a risk of leaking the confidential information.

The functions of the client apparatus 100 of the variation #1 have been described.

(Master Management Server)

Figure 12:
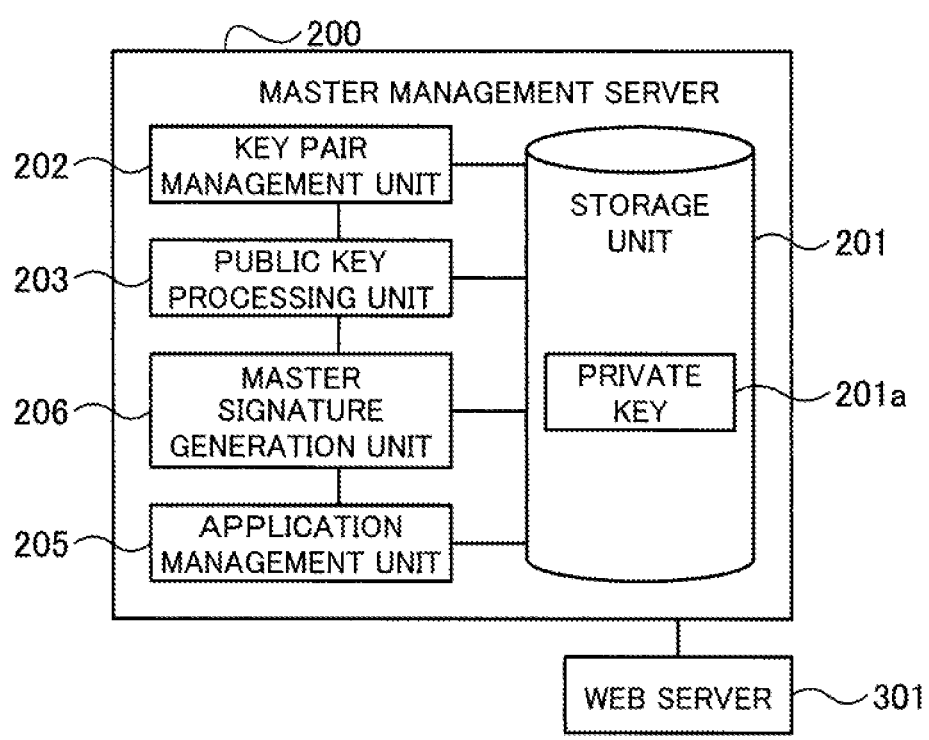
FIG. 12 is a block diagram illustrating an example of functions of a master management server according to the variation #1 of the second embodiment.

Functions of a master management server 200 according to the variation #1 will now be described with reference to FIG. 12. FIG. 12 is a block diagram illustrating an example of the functions of the master management server according to the variation #1 of the second embodiment.

As illustrated in FIG. 12, the master management server 200 includes a storage unit 201, a key pair management unit 202, a public key processing unit 203, a master signature generation unit 206, and an application management unit 205.

A main difference of the master management server 200 of the variation #1 from the master management server 200 of FIG. 6 is that the master signature generation unit 206 replaces the signature generation unit 204.

In this connection, functions of the master signature generation unit 206 may be implemented by using the CPU 101, described earlier, or the like.

The master signature generation unit 206 generates a signature to be attached to master profile data using a private key. The master signature generation unit 206 that has obtained the master profile data checks the content of the master profile data, and if the content is correct, generates a signature to be attached to the master profile data using the private key. Then, the master signature generation unit 206 attaches the generated signature to the master profile data.

In this connection, the content of the master profile data is checked in the following manner, for example.

The master profile data includes a tenant identifier identifying a tenant, the address of a Web server of the tenant, a valid period (start), the valid period (end), and a server certificate, as will be described later.

The master signature generation unit 206 manages tenant information including the tenant identifier, the address of the Web server of the tenant, and others, and if the tenant information matches the content of the master profile data, determines that the content regarding the tenant is correct.

In addition, the master signature generation unit 206 checks the valid period of the server certificate included in the master profile data, and if the valid period is not an apparently questionable value (if it is not too long valid period or the like), determines that the content regarding the valid period is correct.

Then, when the content of the master profile data is determined to be correct in view of the above various items, the master signature generation unit 206 generates a signature to be attached to the master profile data. In this connection, if the content of the master profile data is not determined to be correct in view of the above various items, the master signature generation unit 206 may request the service master to check the content of the master profile data. If the service master determines that the content is correct, the master signature generation unit 206 generates a signature to be attached to the master profile.

The functions of the master management server 200 according to the variation #1 have been described.

(Web Server)

Figure 13:
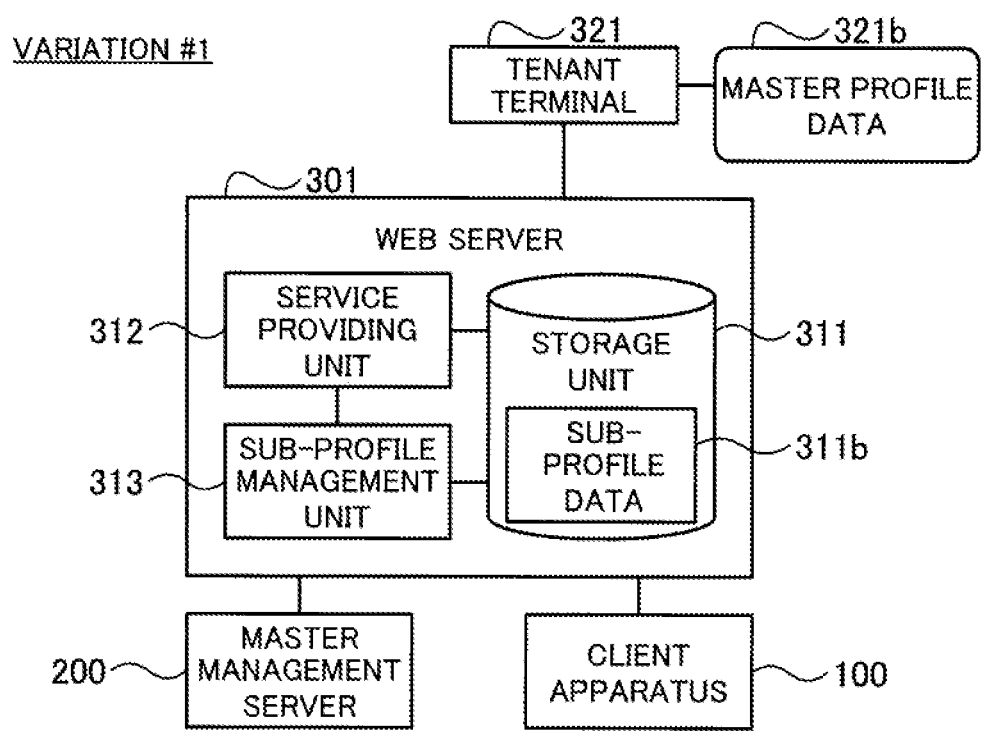
FIG. 13 is a block diagram illustrating an example of functions of a Web server according to the variation #1 of the second embodiment.

The Web server 301 of the variation #1 will now be described with reference to FIG. 13. In this connection, the Web servers 301 and 302 have substantially the same functions, and therefore the functions of the Web server 301 will be described and the functions of the Web server 302 will not be described. FIG. 13 is a block diagram illustrating an example of the functions of the Web server according to the variation #1 of the second embodiment.

As illustrated in FIG. 13, the Web server 301 includes a storage unit 311, a sub-profile management unit 313, and a service providing unit 312. In addition, the Web server 301 is connected to the tenant terminal 321 to be used by the administrator of the tenant as an operating terminal.

A main difference of the Web server 301 of the variation #1 from the Web server 301 of FIG. 7 is that the sub-profile management unit 313 is additionally provided. In addition, the storage unit 311 stores therein sub-profile data 311*b*. In addition, the tenant terminal 321 stores therein master profile data 321*b* in place of the profile data 321*a*.

In this connection, functions of the sub-profile management unit 313 may be implemented by using the CPU 101, described earlier, or the like.

For example, the master profile data 321*b* contains content as illustrated in FIG. 14. FIG. 14 illustrates an example of the master profile data according to the variation #1 of the second embodiment.

As illustrated in FIG. 14, the master profile data 321*b* includes a tenant identifier, the address of a Web server, a valid period (start), the valid period (end), and a server certificate. That is, the profile data 321*a* and the master profile data 321*b* are different in that the master profile data 321*b* does not contain authentication information that is changeable and confidential.

The sub-profile data 311*b* contains content as illustrated in FIG. 15, for example. FIG. 15 illustrates an example of the sub-profile data according to the variation #1 of the second embodiment. As illustrated in FIG. 15, the sub-profile data 311*b* includes an authentication level and a registration quality threshold. The authentication level represents a threshold for comparison that is performed in biometric authentication. The registration quality threshold is a threshold for quality, which is used for determining whether to register biometric data. For example, biometric data is determined to be registered when the quality of the biometric data is greater than or equal to the registration quality threshold.

The tenant terminal 321 generates the master profile data 321b. In addition, the tenant terminal 321 sends the master profile data 321b to the master management server 200 to make a request for attachment of a signature generated using a private key to the master profile data 321b. The tenant terminal 321 then receives the master profile data 321b with the signature attached by the master management server 200.

In addition, the tenant terminal 321 sends the master profile data 321b with the signature attached by the master management server 200, to the client apparatus 100 via an electronic mail, a file server, or another. In addition, the tenant terminal 321 generates the sub-profile data 311b and supplies this data to the Web server 301.

When the signature of the master profile data 321b is verified successfully by the client apparatus 100 and then a TLS connection is established using setting information, the sub-profile management unit 313 supplies the sub-profile data 311b to the client apparatus 100. The service providing unit 312 provides the Web service for the client apparatus 100 when receiving an authentication result indicating an authentication success from the client apparatus 100.

The functions of the Web server 301 according to the variation #1 have been described.

(Profile Data Delivery Scheme)

Figure 16:
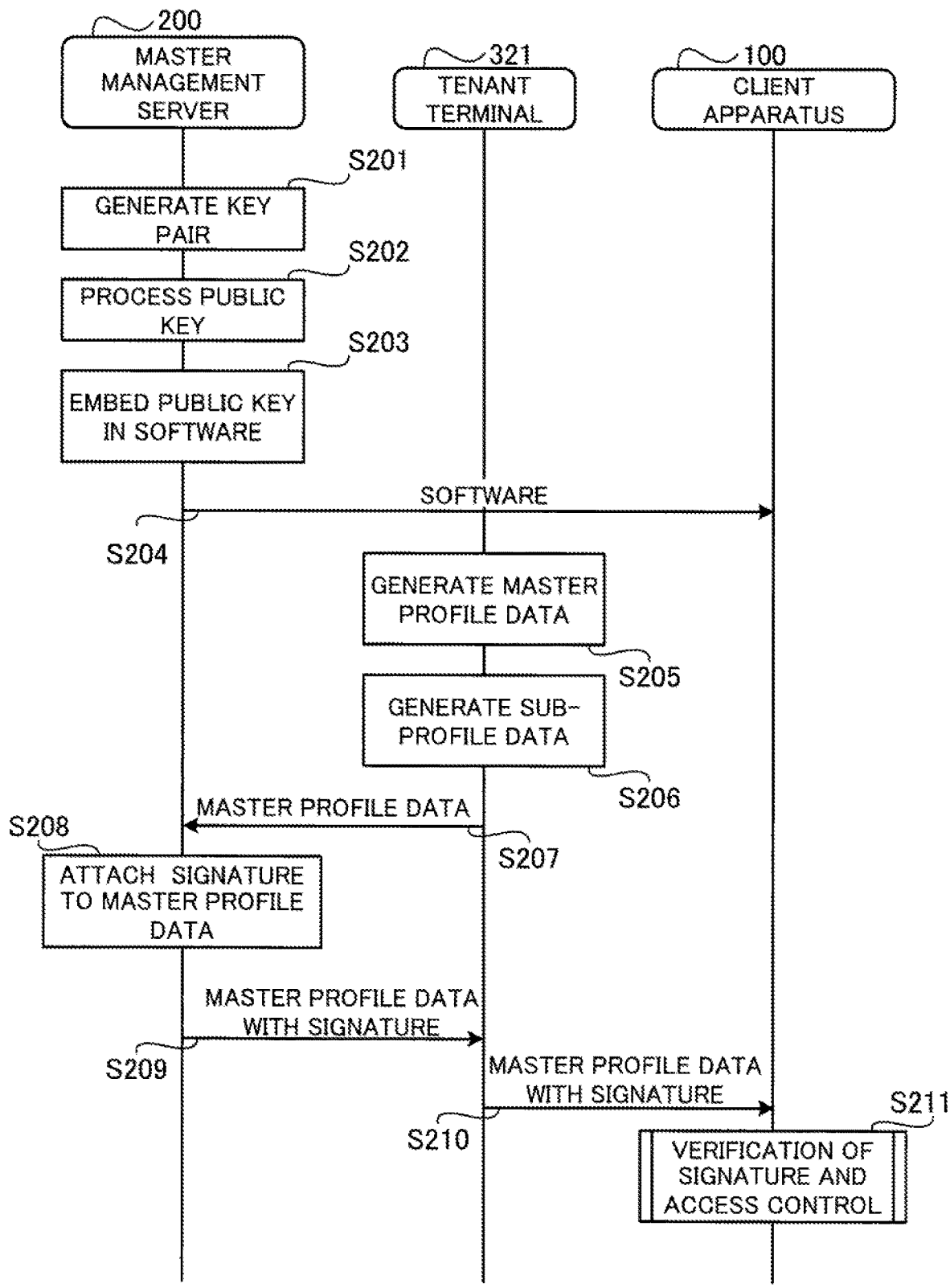
FIG. 16 is a sequence diagram for a process that is performed with a profile data delivery scheme according to the variation #1 of the second embodiment.

The following describes a processing flow from delivery of the master profile data 321b and sub-profile data 311b to access control according to the variation #1, with reference to FIG. 16. FIG. 16 is a sequence diagram for a process that is performed with a profile data delivery scheme according to the variation #1 of the second embodiment.

(S201) The key pair management unit 202 of the master management server 200 generates a pair of public key and private key and stores them as a key pair 201a in the storage unit 201. For example, the key pair management unit 202 generates a pair of public key and private key to be used in common by the Web servers 301 and 302.

(S202) The public key processing unit 203 of the master management server 200 processes the public key. For example, the public key processing unit 203 encrypts the public key with AES or another encryption scheme, to thereby obfuscate the public key. In this connection, the public key processing unit 203 may obfuscate the public key with another method than the encryption.

(S203) The application management unit 205 of the master management server 200 builds the software 111a, and embeds the obfuscated public key in the software 111a. In this connection, the building is a process of generating an executable file by performing a process of compiling the source code of the software 111a, a process of linking libraries, and other processes.

(S204) The application management unit 205 of the master management server 200 delivers the software 111a with the obfuscated public key embedded, to the user (client apparatus 100 or the like) of the Web server 301. For example, the application management unit 205 delivers the software 111a via an online store or the like, which distributes application software. In this connection, the user of the client apparatus 100 obtains and installs the software 111a in the client apparatus 100 (makes the software 111a executable).

(S205) The tenant terminal 321 generates the master profile data 321b (refer to FIG. 14). For example, the tenant terminal 321 generates the master profile data 321b using the prepared tenant identifier, URL of the Web server 301, server certificate, and valid period (start and end) of the server certificate.

(S206) The tenant terminal 321 generates the sub-profile data 311b (refer to FIG. 15). For example, the tenant terminal 321 generates the sub-profile data 311b using the authentication level, registration quality threshold set in advance by the tenant.

(S207) The tenant terminal 321 sends the master profile data 321b to the master management server 200 to make a request for attachment of a signature.

(S208) The master signature generation unit 206 of the master management server 200 generates a signature using the private key, and attaches the signature to the master profile data 321b received from the tenant terminal 321.

(S209) The master signature generation unit 206 of the master management server 200 returns the master profile data 321b with the signature attached, to the tenant terminal 321.

(S210) The tenant terminal 321 delivers the master profile data 321b with the signature attached, received from the master management server 200, to the user (in this example, client apparatus 100) of the Web server 301. For example, the tenant terminal 321 delivers the master profile data 321b with the signature attached, to the client apparatus 100 via a mail, a file server, or the like.

(S211) The master profile verification unit 132 of the client apparatus 100 extracts the public key from the master profile data 321b. Then, the master profile verification unit 132 verifies the signature of the master profile data 321b with the signature attached, delivered from the tenant terminal 321, using the extracted public key. In this connection, the verification of the signature is performed when the software 111a is activated, for example.

In addition, the connection control unit 114 of the client apparatus 100 controls access to the Web server 301 according to the verification result of the signature. If the signature has not been verified, the connection control unit 114 prohibits the sub-profile acquisition unit 133 from obtaining the sub-profile data 311b to thereby prohibit access to the service provided by the Web server 301.

If the signature has been verified successfully, the sub-profile acquisition unit 133 of the client apparatus 100 obtains the sub-profile data 311b from the Web server 301 on the basis of the setting information included in the master profile data 321b. The sub-profile acquisition unit 133 then accesses the Web service provided by the Web server 301 using the sub-profile data 311b.

(Verification of Signature and Access Control)

Figure 17:
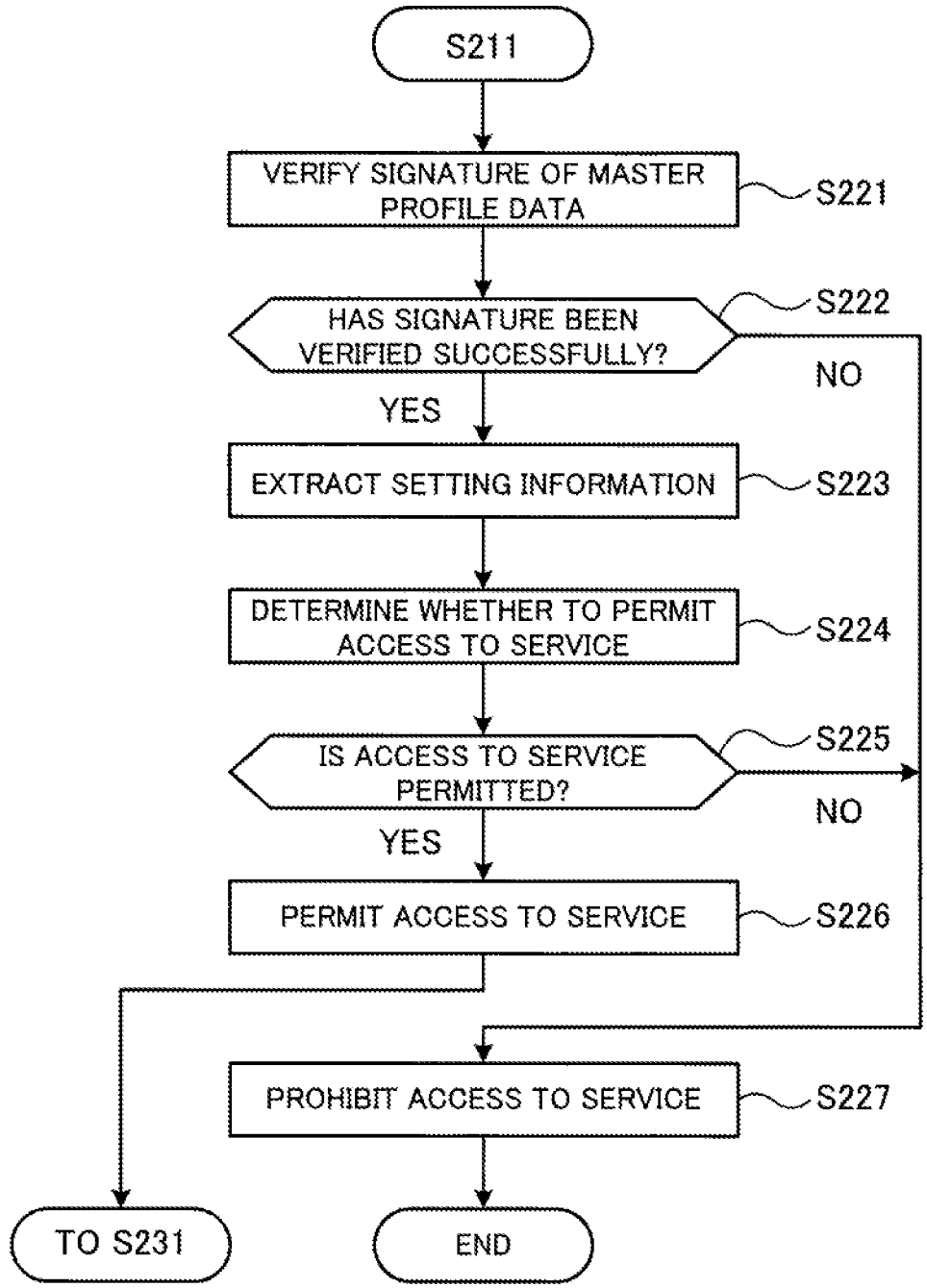
FIG. 17 is a flow diagram for a process relating to verification of a signature and access control according to the variation #1 of the second embodiment.

The following further describes a process relating to the verification of a signature and access control of the above S211, with reference to FIG. 17. FIG. 17 is a flow diagram for the process relating to the verification of a signature and the access control according to the variation #1 of the second embodiment.

(S221) The master profile verification unit 132 extracts a public key from the software 111a. At this time, the master profile verification unit 132 decrypts the public key encrypted with the AES scheme, for example. Then, the master profile verification unit 132 verifies the validity of the signature attached to the master profile data 321b using the extracted public key.

(S222) The connection control unit 114 determines whether the signature has been verified successfully by the master profile verification unit 132 (whether the validity of the signature has been confirmed). If the signature has been verified successfully, the process proceeds to S223. If the signature has not been verified, the process proceeds to S227.

(S223) The connection control unit 114 extracts the setting information from the master profile data 321b. For example, the connection control unit 114 extracts the address of the Web server 301, server certificate, and the valid period (start and end) of the server certificate from the master profile data 321b. Then, at the time of accessing the Web server 301 using the software 111a, the connection control unit 114 makes the extracted setting information usable in authentication (loading of the setting information).

(S224) The connection control unit 114 determines whether to permit or prohibit access to the service provided by the Web server 301. For example, if the valid period of the server certificate is expired, the connection control unit 114 determines to prohibit access to the service.

(S225) If permission of the access to the service is determined at S224 (if the master profile data with the signature attached contains setting information for which access permission is determined), the process proceeds to S226. If prohibition of the access to the service is determined (if the master profile data with the signature attached does not contain setting information for which access permission is determined), the process proceeds to S227.

(S226) The connection control unit 114 permits the software 111a to access the service (Web service provided by the Web server 301). When this S226 is completed, the process proceeds to the authentication process (S231 of FIG. 18), which will be described later.

(S227) The connection control unit 114 prohibits access of the software 111a to the service (Web service provided by the Web server 301). That is to say, the connection control unit 114 exercises control so as not to access the Web server 301 using the software 111a. When S227 is completed, the process of FIG. 17 is completed.

(Authentication Process)

Figure 18:
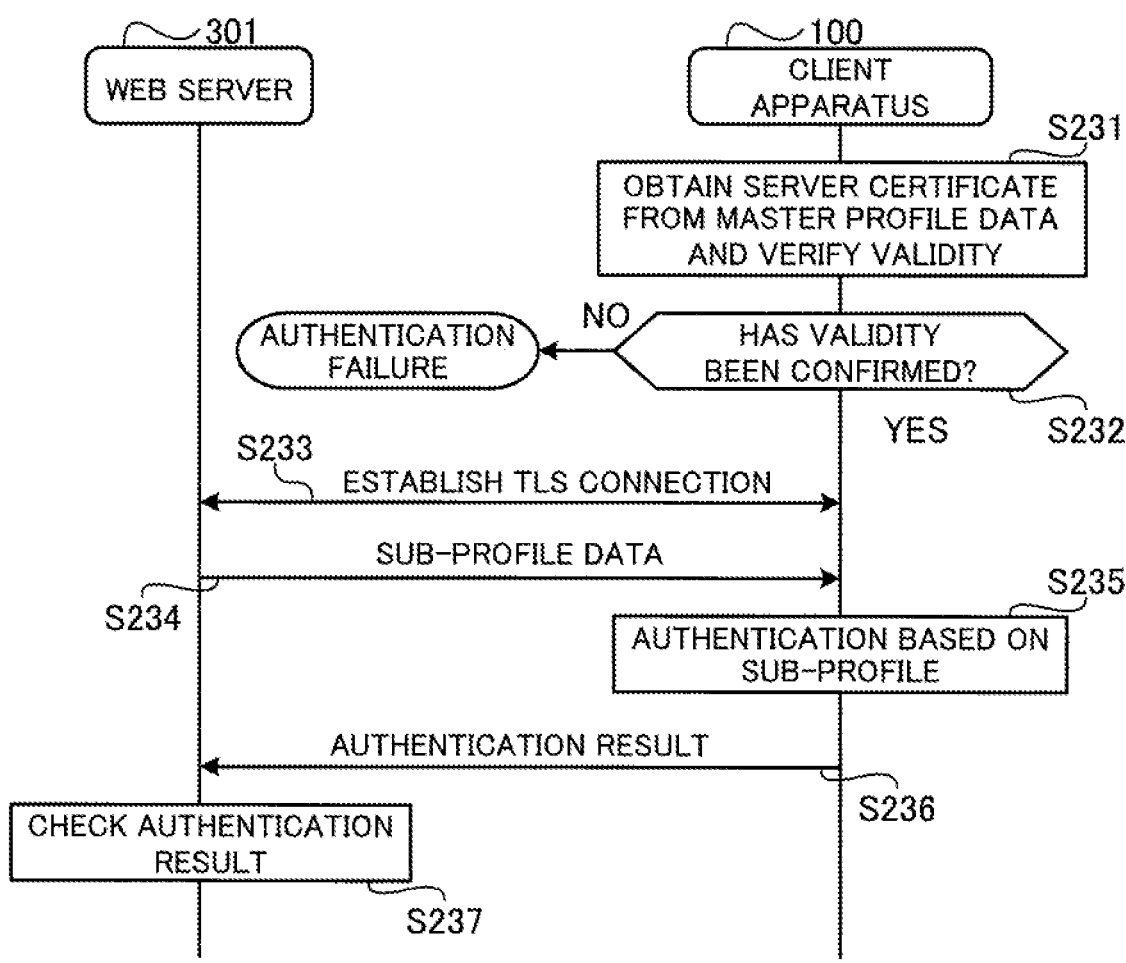
FIG. 18 is a sequence diagram for an authentication process according to the variation #1 of the second embodiment.

The following further describes an authentication process to be performed when the above S226 is completed. FIG. 18 is a sequence diagram for the authentication process according to the variation #1 of the second embodiment.

(S231) The sub-profile acquisition unit 133 of the client apparatus 100 accesses the address of the Web server 301 included in the setting information of the master profile data 321b to obtain a server certificate from the Web server 301. In addition, the sub-profile acquisition unit 133 confirms the validity of the Web server 301 using the obtained server certificate and the server certificate included in the setting information of the master profile data 321b.

(S232) The sub-profile acquisition unit 133 of the client apparatus 100 determines whether the validity has been confirmed (whether the validity has been verified successfully). If the validity has been confirmed, the process proceeds to S233. If the validity has not been confirmed, this means that the authentication process of FIG. 18 fails and therefore access to the Web service provided by the Web server 301 is prohibited.

(S233) The sub-profile acquisition unit 133 of the client apparatus 100 establishes a TLS connection with the Web server 301.

(S234) The sub-profile management unit 313 of the Web server 301 sends the sub-profile data 311b to the client apparatus 100.

(S235 and S236) The sub-profile acquisition unit 133 of the client apparatus 100 performs an authentication process based on the authentication level and registration quality threshold indicated in the sub-profile data 311b. For example, the client apparatus 100 performs the authentication using a fingerprint reader device or the like. Then, the sub-profile acquisition unit 133 sends the authentication result to the Web server 301.

(S237) The service providing unit 312 of the Web server 301 checks the authentication result received from the client apparatus 100. If the authentication result indicates an authentication success, the service providing unit 312 provides the Web service for the client apparatus 100. If the authentication result indicates an authentication failure, the service providing unit 312 does not provide the Web service for the client apparatus 100. When S237 is completed, the processing flow of FIG. 18 is completed.

The variation #1 has been described.

(2-6. Variation Example #2)

Another variation example (variation #2) of the second embodiment will now be described.

The setting information of the master profile data according to the above-described variation #1 includes the address of a Web server and a server certificate. The variation #2 relates to a mechanism in which such setting information additionally includes information indicating how a server certificate was issued.

In the variation #1, the client apparatus 100 verifies the signature of master profile data, and if the verification is successful, obtains sub-profile data. If the verification fails, access to the service is prohibited. The variation #2 additionally provides a mechanism of checking a method of issuing a server certificate, in addition to the verification of the signature of the master profile data, and controlling whether to connect to the Web server depending on the check result.

As will be described later, the addition of this mechanism makes it possible to confirm the validity of a Web server without checking the valid period of a server certificate in the case where a specific method is employed for issuing the server certificate.

In the variation #2, to achieve the above mechanism, the content of master profile data 321b is modified as illustrated in FIG. 19. FIG. 19 illustrates an example of the master profile data according to the variation #2 of the second embodiment.

As illustrated in FIG. 19, the master profile data 321b includes a tenant identifier, the address of a Web server, a valid period (start), the valid period (end), a server certificate, and a server certificate issuance method. The server certificate issuance method is a letter string indicating either self-issuance (a server certificate has been issued by the Web server itself) or issuance by a certificate authority.

(Authentication Process)

Figure 20:
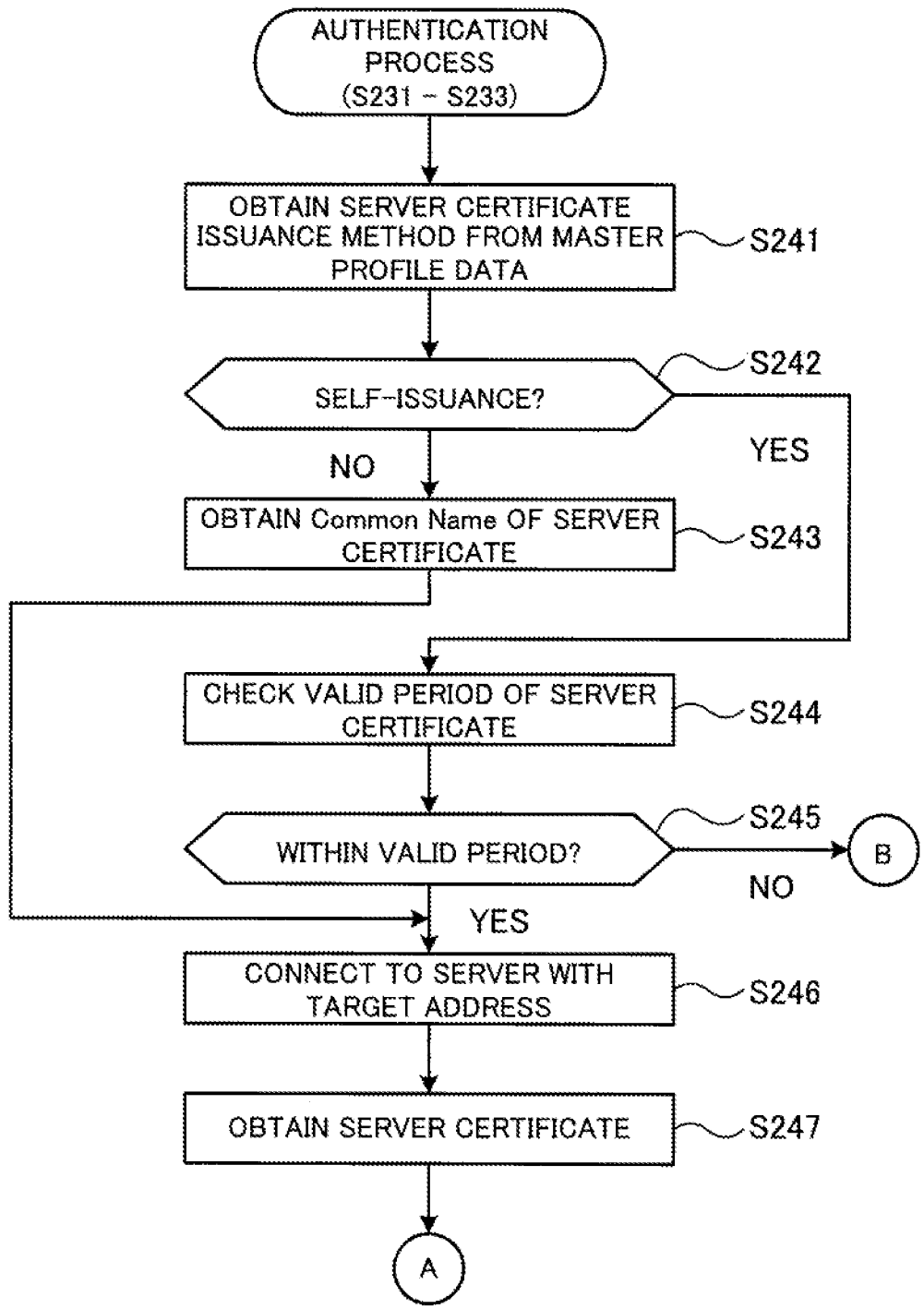
FIGS. 20 and 21 are a flow diagram for an authentication process according to the variation #2 of the second embodiment.
Figure 21:
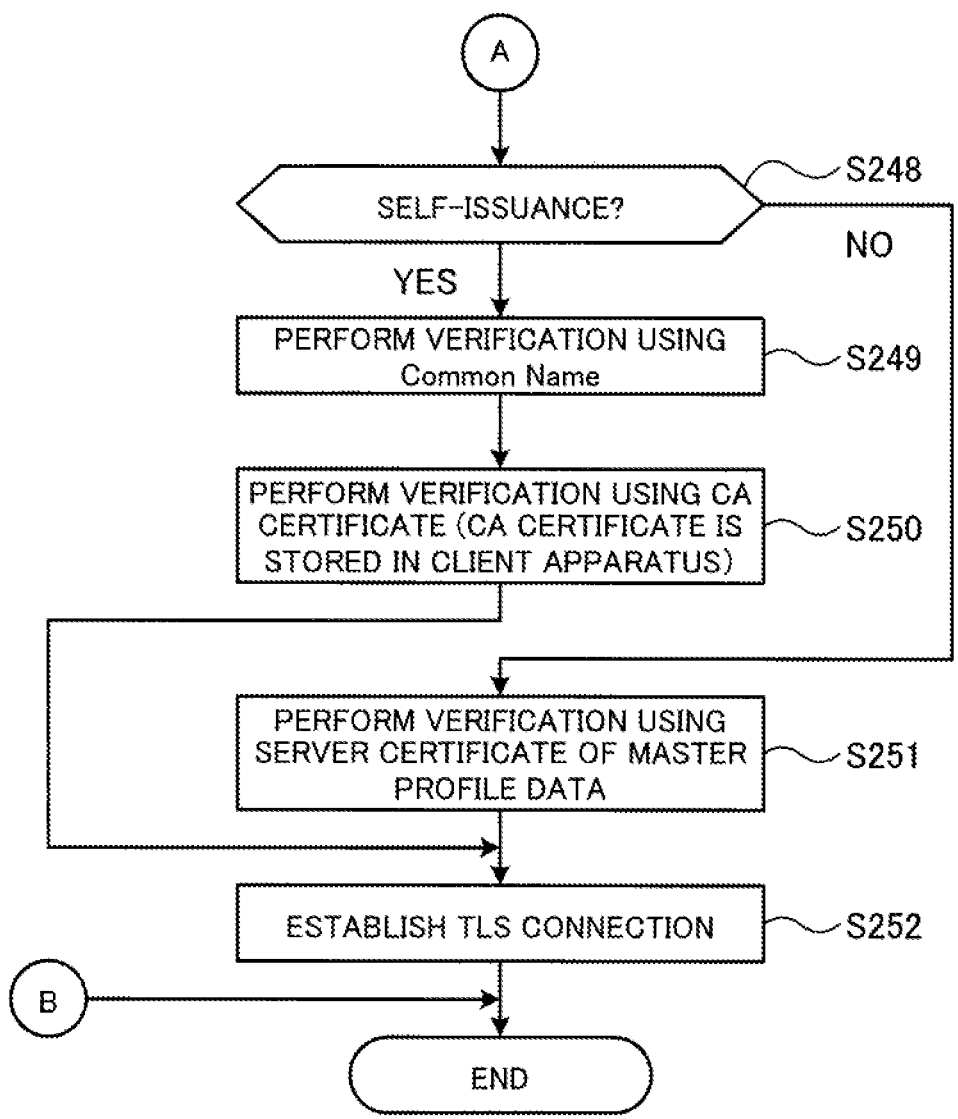

The variation #2 provides a modification of the process up to establishment of a TLS connection (corresponding to S231 to S233) as illustrated in FIGS. 20 and 21, out of the authentication process of FIG. 18.

FIGS. 20 and 21 are a flow diagram for an authentication process according to the variation #2 of the second embodiment.

(S241) The sub-profile acquisition unit 133 checks a server certificate issuance method indicated in the master profile data 321b to confirm whether the issuance is self-issuance or issuance by a certificate authority.

(S242) If the server certificate of the Web server 301 was issued by the self-issuance, the process proceeds to S244. If the server certificate of the Web server 301 was issued by a certificate authority, the process proceeds to S243.

(S243) The sub-profile acquisition unit 133 obtains Common Name from the server certificate included in the master profile data 321*b*. The Common Name is the URL of a site in which an encryption communication is performed using the server certificate. After S243 is completed, the process proceeds to S246.

(S244) The sub-profile acquisition unit 133 checks the valid period of the server certificate indicated in the master profile data 321*b*.

(S245) If the valid period of the server certificate is not expired (if it is within the valid period), the process proceeds to S246. If the valid period of the server certificate is expired, the connection control unit 114 prohibits access to the Web server whose address is indicated in the master profile data 321*b*. In this case, the series of processing illustrated in FIGS. 20 and 21 is completed.

(S246 and S247) The sub-profile acquisition unit 133 connects to the Web server 301 using the address of the Web server 301 indicated in the master profile data 321*b*. Then, the sub-profile acquisition unit 133 obtains the server certificate from the Web server 301.

(S248) If the server certificate of the Web server 301 was issued by self-issuance, the process proceeds to S249. If the server certificate of the Web server 301 was issued by a certificate authority, the process proceeds to S251.

(S249) The sub-profile acquisition unit 133 obtains the server certificate from the Web server 301, and verifies the server certificate using Common Name.

For example, the sub-profile acquisition unit 133 compares the Common Name of the server certificate obtained from the Web server 301 with the Common Name obtained from the server certificate of the master profile data 321*b*. If these two Common Name are identical, the sub-profile acquisition unit 133 determines that the verification is successful.

(S250) The sub-profile acquisition unit 133 performs verification using the Certification Authority (CA) certificate stored in advance in the storage unit 111 (certificate store) and the server certificate of the master profile data 321*b*. In this connection, the certificate store is a storage space for storing certificates issued by certificate authorities.

If the verification is successful, the process proceeds to S252. If the verification fails, the connection control unit 114 prohibits access to the service provided by the Web server 301. In this case, the series of processing illustrated in FIGS. 20 and 21 is completed.

(S251) The sub-profile acquisition unit 133 performs the verification using the server certificate of the master profile data 321*b*. If the verification is successful, the process proceeds to S252. If the verification fails, the connection control unit 114 prohibits access to the service provided by the Web server 301. In this case, the series of processing illustrated in FIGS. 20 and 21 is completed.

(S252) The sub-profile acquisition unit 133 establishes a TLS connection with the Web server 301. When S252 is completed, the series of processing illustrated in FIGS. 20 and 21 is completed.

As described above, the mechanism of skipping the check of a valid period in the case of using a server certificate issued by a certificate authority makes it possible to reduce the time and cost taken to re-issue a server certificate due to an expiration of the valid period.

The variation #2 has been described.

(2-7. Variation Example #3)

The following describes another variation example (variation #3) of the second embodiment.

The variation #3 relates to a mechanism in which a master management server 200 confirms the validity of sub-profile data using license information. In the variation #3, the master management server 200 determines on the basis of the license information whether to permit the use of the sub-profile data, and when determining to permit the use, supplies sub-profile data to the client apparatus. In this connection, a license is a contract that is concluded between a service master (cloud service provider) and a tenant to allow a user of the tenant to use biometric authentication.

(Master Management Server)

Figure 22:
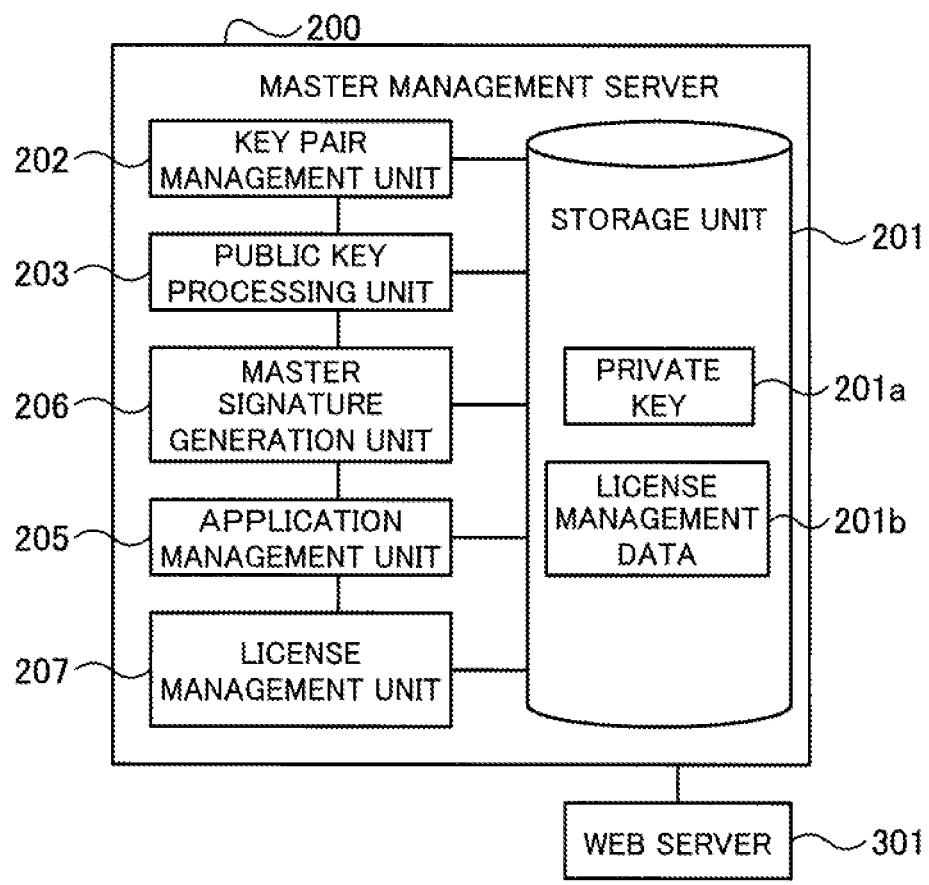
FIG. 22 is a block diagram illustrating an example of functions of a master management server according to a variation example (variation #3) of the second embodiment.

The functions of the master management server 200 according to the variation #3 will now be described with reference to FIG. 22. FIG. 22 is a block diagram illustrating an example of the functions of the master management server according to the variation #3 of the second embodiment.

As illustrated in FIG. 22, the master management server 200 includes a storage unit 201, a key pair management unit 202, a public key processing unit 203, a master signature generation unit 206, an application management unit 205, and a license management unit 207.

A main difference of the master management server 200 of the variation #3 from the master management server 200 of the variation #1 is that the storage unit 201 additionally stores therein license management data 201*b* and that the license management unit 207 is additionally provided.

In this connection, functions of the license management unit 207 may be implemented by using the CPU 101, described earlier, or the like.

The license management data 201*b* contains content as illustrated in FIG. 23. FIG. 23 illustrates an example of the license management data according to the variation #3 of the second embodiment. As illustrated in FIG. 23, the license management data 201*b* includes a combination of user name and license information for each user, in addition to a tenant identifier and the address of a Web server. For example, license information #1 corresponds to a user name #1.

The user name is identification information to be used when a license is confirmed. For example, the mail address of a user who desires to use the Web server is used as a user name. The license information is attribute information of a license held by the user of a corresponding user name. For example, as the attribute information, an authentication method, such as fingerprint authentication or vein authentication, information (terminal information) about a terminal device (client apparatus 100 or the like) used by the user, or another is used. For example, as the terminal information, a Media Access Control (MAC) address, IP address, or another may be used.

When requested to confirm the validity of sub-profile data from a Web server 301, 302, the license management unit 207 confirms the validity in response to the request and returns the confirmation result to the requesting source. At this time, the license management unit 207 checks the license management data 201*b* to confirm the license of the sub-profile data 311*b*.

For example, if the user (user name: hogehogel@example.com) of the tenant A has a license for fingerprint authentication only, the license management unit 207 fails to confirm the validity of the sub-profile data 311*b* that is to be supplied and that requests the vein authentication.

As described above, information such as an authentication method, in addition to the user name and terminal information, is managed in association with a license, and the license management unit 207 confirms the validity when the sub-profile data 311*b* is supplied. The sub-profile data 311*b* determined to be valid is supplied to the client apparatus 100. The sub-profile data 311b that is not determined to be valid is not supplied to the client apparatus 100.

The functions of the master management server 200 according to the variation #3 have been described.

(Web Server)

Figure 24:
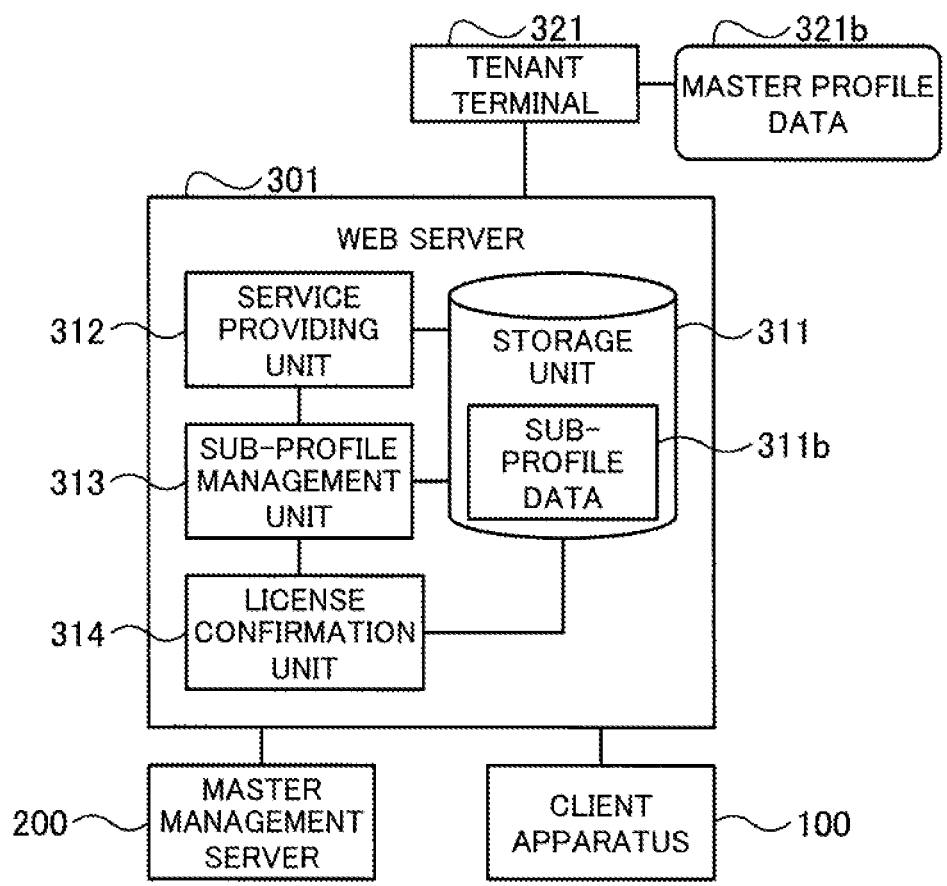
FIG. 24 is a block diagram illustrating an example of functions of a Web server according to the variation #3 of the second embodiment.

The Web server 301 according to the variation #3 will now be described with reference to FIG. 24. Since the Web servers 301 and 302 have substantially the same functions, the functions of the Web server 301 will be described, and the functions of the Web server 302 will not be described. FIG. 24 is a block diagram illustrating an example of the functions of the Web server according to the variation #3 of the second embodiment.

As illustrated in FIG. 24, the Web server 301 includes a storage unit 311, a service providing unit 312, a sub-profile management unit 313, and a license confirmation unit 314. In addition, the Web server 301 is connected to the tenant terminal 321.

A main difference of the Web server 301 of the variation #3 from the Web server 301 of the variation #1 is that the license confirmation unit 314 is additionally provided.

In this connection, functions of the license confirmation unit 314 may be implemented by using the CPU 101, described earlier, or the like.

When the sub-profile data 311b is supplied to the client apparatus 100 or when the service providing unit 312 checks an authentication result received from the client apparatus 100, the license confirmation unit 314 confirms the validity of the sub-profile data 311b.

For example, the license confirmation unit 314 sends the tenant identifier of a tenant which manages the Web server 301, the address of the Web server 301, and a user name used as a provision destination of the sub-profile data 311b, an authentication method, and others to the master management server 200.

Upon receiving a notification indicating validity from the master management server 200, the license confirmation unit 314 permits the supply of the sub-profile data 311b by the sub-profile management unit 313 or the provision of a service by the service providing unit 312. Upon receiving a notification indicating invalidity from the master management server 200, the license confirmation unit 314 prohibits the supply of the sub-profile data 311b by the sub-profile management unit 313 or the provision of the service by the service providing unit 312.

The functions of the Web server 301 according to the variation #3 have been described.

(Authentication Process)

Figure 25:
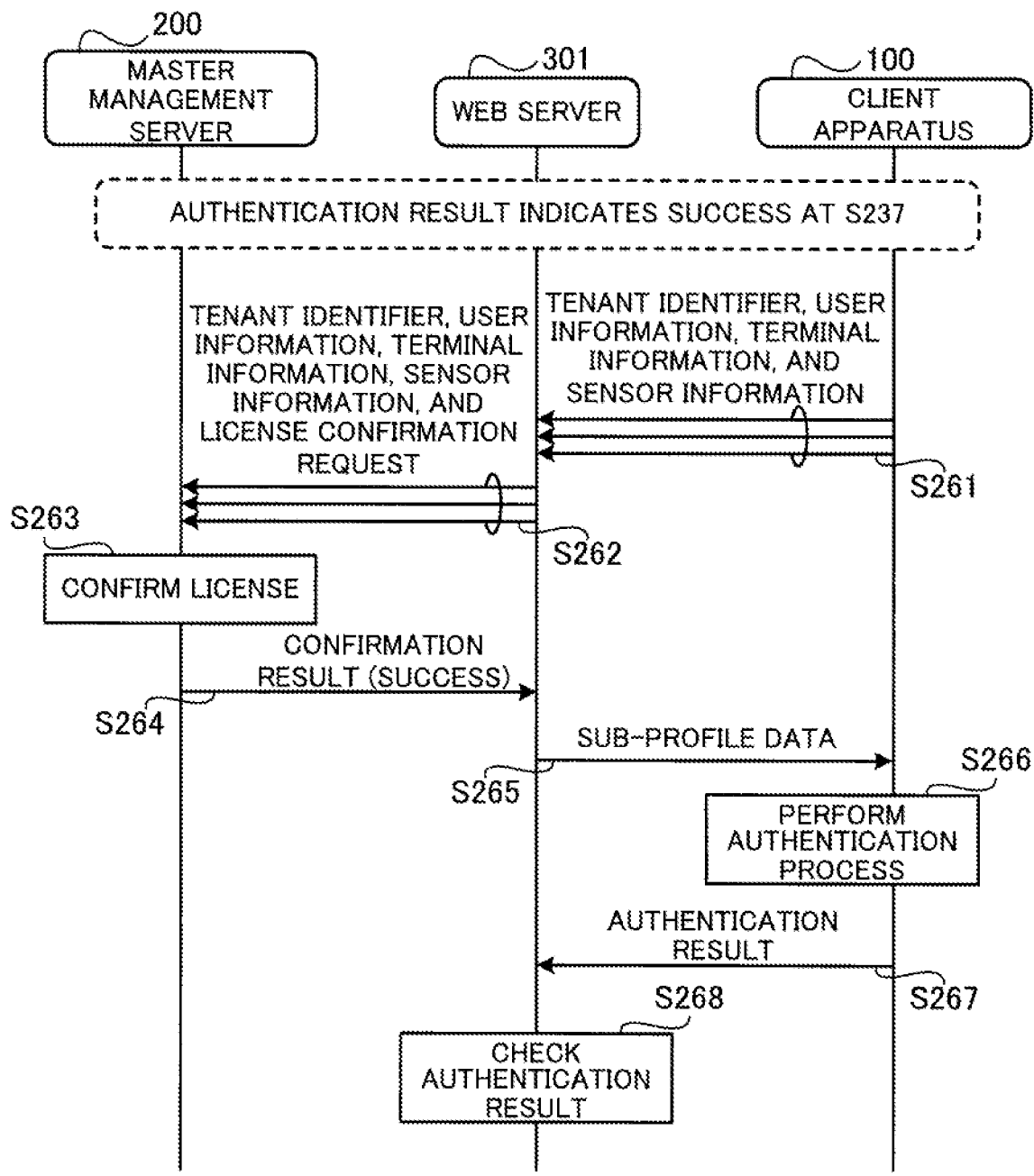
FIG. 25 is a sequence diagram for an authentication process (in the case where a license has been confirmed) according to the variation #3 of the second embodiment.
Figure 26:
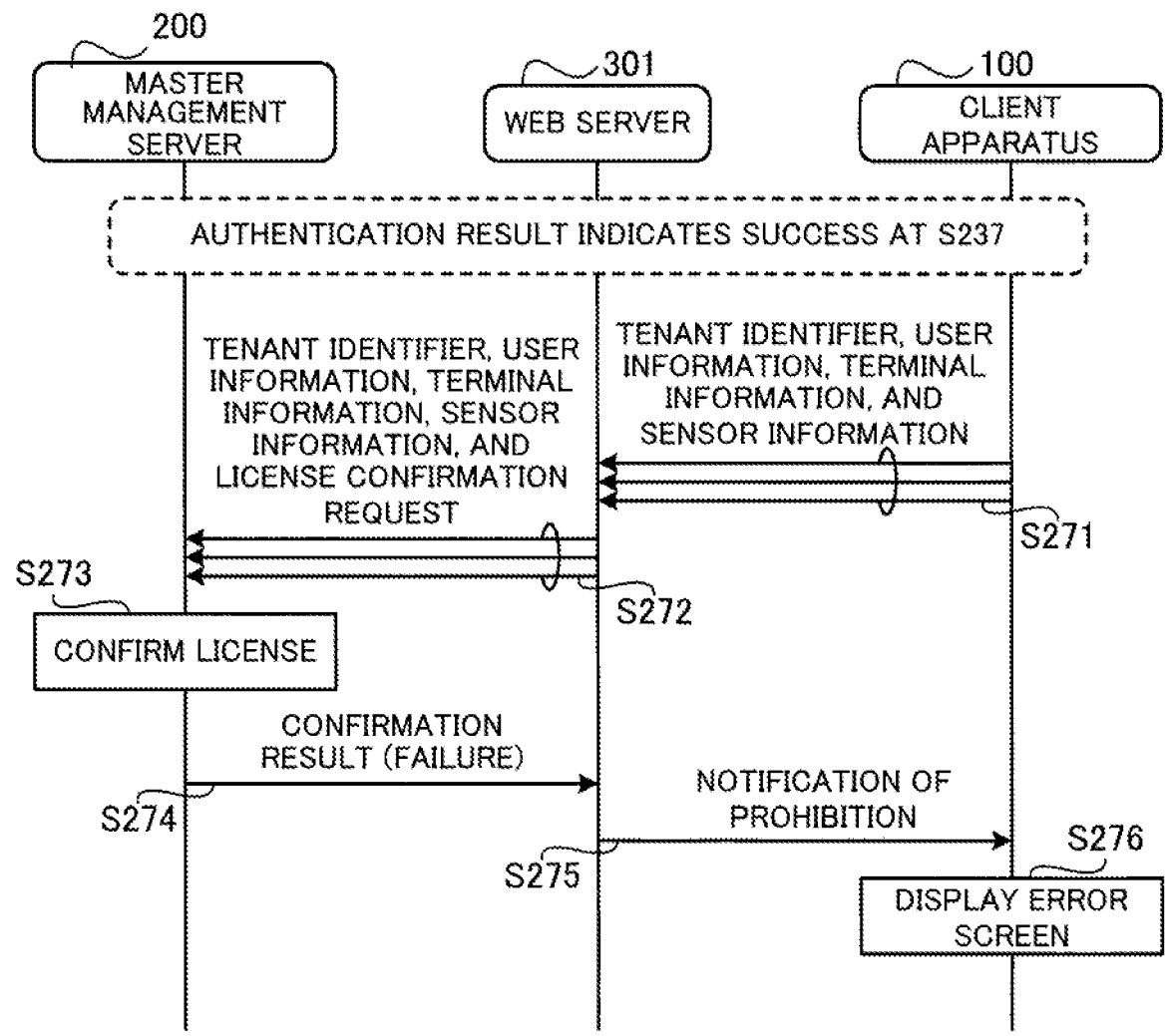
FIG. 26 is a sequence diagram for the authentication process (in the case where the license has not been confirmed) according to the variation #3 of the second embodiment.

In the variation #3, part (S234 and successive steps) of the authentication process of FIG. 18 has been modified as illustrated in FIGS. 25 and 26. FIG. 25 is a sequence diagram for an authentication process (in the case where a license has been confirmed) according to the variation #3 of the second embodiment. FIG. 26 is a sequence diagram for the authentication process (in the case where the license has not been confirmed) according to the variation #3 of the second embodiment.

(S261) To obtain the sub-profile data 311b, the sub-profile acquisition unit 133 of the client apparatus 100 sends the tenant identifier corresponding to the Web server 301, the user information of a user, and terminal information to the Web server 301. The user information is a mail address or the like, for example. The terminal information is a host name, MAC address or the like of the client apparatus 100, for example.

In addition, the sub-profile acquisition unit 133 sends information (sensor information) about an authentication means that is usable by the client apparatus 100, to the Web server 301. The sensor information includes information identifying an authentication means, such as a fingerprint sensor for detecting fingerprints or a vein sensor for obtaining vein patterns. In this connection, information about all sensors connected to the client apparatus 100 may be included in the sensor information, or only information about a sensor set as a sensor usable by the software 111a may be included in the sensor information.

(S262) The license confirmation unit 314 of the Web server 301 sends the tenant identifier, user information, terminal information, and sensor information received from the client apparatus 100, to the master management server 200 to make a request for confirmation of the license.

(S263) The license management unit 207 of the master management server 200 specifies the license information about a target user from the license management data 201b, using the tenant identifier and user information received from the Web server 301. Then, the license management unit 207 compares the terminal information and sensor information received from the Web server 301 with the terminal information and authentication means included in the specified license information.

(S264) In the example of FIG. 25, it is assumed that as a result of the comparison of S263, the license information about the target user is specified, and the terminal information and sensor information received by the master management server 200 match the content of the license information. In this case, the master management server 200 sends a confirmation result (success) indicating that the license has been confirmed, to the Web server 301.

(S265) When the Web server 301 has received the confirmation result (success), the sub-profile management unit 313 sends the sub-profile data 311b to the client apparatus 100.

(S266 and S267) The sub-profile acquisition unit 133 of the client apparatus 100 performs an authentication process based on the authentication level and registration quality threshold indicated in the sub-profile data 311b. Then, the sub-profile acquisition unit 133 sends the result of the authentication to the Web server 301.

(S268) The service providing unit 312 of the Web server 301 checks the authentication result received from the client apparatus 100. When S268 is completed, the series of processing illustrated in FIG. 25 is completed.

In the case where the license has not been confirmed, the following process is performed.

(S271) To obtain the sub-profile data 311b, the sub-profile acquisition unit 133 of the client apparatus 100 sends the tenant identifier corresponding to the Web server 301, the user information of the user, and the terminal information to the Web server 301. In addition, the sub-profile acquisition unit 133 sends the sensor information to the Web server 301.

(S272) The license confirmation unit 314 of the Web server 301 sends the tenant identifier, user information, terminal information, and sensor information received from the client apparatus 100, to the master management server 200 to make a request for confirmation of the license.

(S273) The license management unit 207 of the master management server 200 specifies the license information of the target user from the license management data 201b using the tenant identifier and user information received from the Web server 301. Then, the license management unit 207 compares the terminal information and sensor information received from the Web server 301 with the terminal information and authentication means included in the specified license information.

(S274) In the example of FIG. 26, it is assumed that, as a result of the comparison at S273, the license information about the target user is not specified, or the terminal information or sensor information received by the master management server 200 do not match the content of the license information. In this case, the master management server 200 sends a confirmation result (failure) indicating that the license has not been confirmed, to the Web server 301.

(S275) The sub-profile management unit 313 of the Web server 301 that has received the confirmation result (failure) sends a notification (notification of prohibition) indicating that the supply of the sub-profile data 311b is prohibited, to the client apparatus 100.

(S276) The sub-profile acquisition unit 133 of the client apparatus 100 displays an error screen indicating the failure of the authentication process. In this connection, when the authentication process has failed due to a different authentication method, the sub-profile acquisition unit 133 may display information indicating the type of proper authentication method or an operational screen for the authentication method. When S267 is completed, the series of processing illustrated in FIG. 26 is completed.

The variation #3 has been described.

(Other Variations)

Examples of employing the public-key signature scheme have been described. Alternatively, for example, another variation may be employed, in which the signature of profile data including the signature generated using a common key is verified using the common key embedded in the software 111a. Further, there is another variation of adding a mechanism in which a version number is given to profile data that is then managed, and different key pairs are used for respective version numbers.

Still further, there is yet another variation of adding a mechanism in which the master management server 200 having the same domain is allowed to generate a key pair. Still further, there is yet another variation in which Web servers of tenants employing the same authentication level are managed in association with the same key pair. In this case, the same public key processing method may be employed for a public key corresponding to the Web servers of the tenants employing the same authentication level.

In addition, in the above description, it is assumed that biometric data is held in the client apparatus. Alternatively, biometric data to be used in authentication may be held in the Web server. It is a matter of course that such variations fall within the technical scope of the second embodiment.

The second embodiment has been described.

According to one aspect, it is possible to efficiently detect falsification of profile data that is used in an authentication process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A profile data delivery control apparatus comprising:
a memory that stores therein a public key and a private key corresponding to the public key; and
a processor that performs a process including
obtaining, with respect to each of two or more services provided using a server, first profile data used in server authentication and including identification information of the server, and responsive to determining that the first profile data satisfies a prescribed validity condition, attaching a signature to the first profile data using the private key, and
embedding the public key in a client application so that the public key is used to verify the signature, and delivering the client application with the public key embedded, the client application causing a client to perform an authentication process based on the first profile data, the client application causing the client to access the server by using the identification information and to obtain second profile data used in service authentication from the server for accessing a service,
wherein the client application permits the client to obtain the second profile data to be used in the authentication process from the server responsive to determining that the verifying of the signature using the public key is successful; and
the client application prohibits the client from obtaining the second profile data to be used in the authentication process from the server responsive to determining that the verifying of the signature using the public key has failed.

2. The profile data delivery control apparatus according to claim 1, wherein:
the client application permits the client to access a service corresponding to the first profile data responsive to determining that the verifying of the signature using the public key is successful; and
the client application prohibits the client from accessing the service corresponding to the first profile data responsive to determining that the verifying of the signature using the public key has failed.

3. The profile data delivery control apparatus according to claim 1, wherein:
the memory further stores therein license information indicating a license of an authentication method; and
the process further includes
determining whether the client has the license based on the license information in response to a request for the second profile data from the client, and
rejecting the request responsive to determining that the client does not have the license.

4. A profile data delivery control method to be executed by a computer including a memory and a processor, the profile data delivery control method comprising:
reading, by the processor, a public key and a private key corresponding to the public key from the memory;
obtaining, by the processor, with respect to each of two or more services provided using a server, first profile data used in server authentication and including identification information of the server, and responsive to determining that the first profile data satisfies a prescribed validity condition, attaching a signature to the first profile data using the private key; and
embedding, by the processor, the public key in a client application so that the public key is used to verify the signature, and delivering the client application with the public key embedded, the client application causing a client to perform an authentication process based on the first profile data, the client application causing the client to access the server by using the identification information and to obtain second profile data used in service authentication from the server for accessing a service, wherein the client application permits the client to obtain the second profile data to be used in the authentication process from the server responsive to determining that the verifying of the signature using the public key is successful; and the client application prohibits the client from obtaining the second profile data to be used in the authentication process from the server responsive to determining that the verifying of the signature using the public key has failed.

5. A non-transitory computer-readable storage medium storing a profile data delivery control program that causes a processor of a computer including a memory and the processor to perform a process including:

reading a public key and a private key corresponding to the public key from the memory;

obtaining, with respect to each of two or more services provided using a server, first profile data used in server authentication and including identification information of the server, and responsive to determining that the first profile data satisfies a prescribed validity condition, attaching a signature to the first profile data using the private key; and embedding the public key in a client application so that the public key is used to verify the signature, and delivering the client application with the public key embedded, the client application causing a client to perform an authentication process based on the first profile data, the client application causing the client to access the server by using the identification information and to obtain second profile data used in service authentication from the server for accessing a service, wherein the client application permits the client to obtain the second profile data to be used in the authentication process from the server responsive to determining that the verifying of the signature using the public key is successful; and the client application prohibits the client from obtaining the second profile data to be used in the authentication process from the server responsive to determining that the verifying of the signature using the public key has failed.

\* \* \* \* \*